United States Patent
Hannuksela

(10) Patent No.: US 10,554,990 B2
(45) Date of Patent: Feb. 4, 2020

(54) APPARATUS, A METHOD AND A COMPUTER PROGRAM FOR VIDEO CODING AND DECODING

(71) Applicant: Nokia Technologies Oy, Espoo (FI)

(72) Inventor: Miska Matias Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 241 days.

(21) Appl. No.: 14/512,863

(22) Filed: Oct. 13, 2014

(65) Prior Publication Data

US 2015/0103921 A1    Apr. 16, 2015

Related U.S. Application Data

(60) Provisional application No. 61/890,496, filed on Oct. 14, 2013.

(51) Int. Cl.
*H04N 19/423* (2014.01)
*H04N 19/433* (2014.01)

(52) U.S. Cl.
CPC .................. *H04N 19/433* (2014.11)

(58) Field of Classification Search
CPC ............................ H04N 19/433; H04N 19/152
USPC ...................................... 375/240.26
See application file for complete search history.

(56) References Cited

U.S. PATENT DOCUMENTS

| | | | |
|---|---|---|---|
| 4,961,605 A | 10/1990 | Cawthron et al. | |
| 5,409,746 A | 4/1995 | Mimura | |
| 6,436,212 B1 | 8/2002 | Warner | |
| 2007/0085361 A1 | 4/2007 | Hauser | |
| 2010/0246662 A1* | 9/2010 | Koto | H04N 21/8547 375/240.1 |
| 2011/0012797 A1 | 1/2011 | Tani et al. | |
| 2011/0127797 A1 | 6/2011 | Garnett et al. | |
| 2013/0182755 A1* | 7/2013 | Chen | H04N 19/70 375/240.01 |
| 2013/0273945 A1* | 10/2013 | Deshpande | H04N 19/46 455/466 |

(Continued)

FOREIGN PATENT DOCUMENTS

| | | |
|---|---|---|
| DE | 3822398 | 1/1990 |
| EP | 0215189 | 3/1987 |
| EP | 1743805 | 1/2007 |

OTHER PUBLICATIONS

Tabatabai et al., U.S. Appl. No. 61/846,552 of Tabatabai reference, filed Jul. 15, 2013.*

(Continued)

*Primary Examiner* — Matthew K Kwan
(74) *Attorney, Agent, or Firm* — Alston & Bird LLP

(57) ABSTRACT

A method comprising: associating a first set of data units into a first bitstream partition and associating a second set of data units into a second bitstream partition, where the first set comprises data units different from those of the second set; inputting the first bitstream partition into a first buffer; inputting the second bitstream partition into a second buffer; obtaining buffering parameters for at least one of the second bitstream partition and the second buffer; and using the buffering parameters in at least one of inputting the second bitstream partition into the second buffer and outputting from the second buffer.

16 Claims, 8 Drawing Sheets

(56) References Cited

U.S. PATENT DOCUMENTS

2014/0098896 A1* 4/2014 Wang .............. H04N 19/70
375/240.26
2015/0016547 A1 1/2015 Tabatabai et al.

OTHER PUBLICATIONS

International Search Report and Written Opinion received for corresponding Patent Cooperation Treaty Application No. PCT/IB2014/065282, dated Feb. 4, 2015, 16 pages.
Narasimhan et al., "Consideration of buffer management issues HEVC scalability", Joint Collaborative Team on Video Coding (JCT-VC) of ITU-T SG 16 WP 3 and ISO/IEC JTC 1/SC 29/WG 11, JCTVC-N0049, 14th Meeting, Jul. 29-Aug. 2, 2013. pp. 1-6.
Hannuksela et al., "MV-HEVC/SHVC HLS / JCT-VC AHG20: Multi-layer HRD operation", Joint Collaborative Team on Video Coding (JCT-VC) of ITU-T SG 16 WP 3 and ISO/IEC JTC 1/SC 29/WG 11, JCTVC-O0164, 15th Meeting, Oct. 23-Nov. 1, 2013, 16 pages.
Hannuksela et al., "AHG9: Operation Points in VPS and Nesting SEI", Joint Collaborative Team on Video Coding (JCT-VC) of ITU-T SG 16 WP 3 and ISO/IEC JTC 1/SC 29/WG 11, JCTVC-K0180, 11th Meeting, Oct. 10-19, 2012, pp. 1-5.
"Advanced Video Coding for Generic Audiovisual Services", Series H: Audiovisual and Multimedia Systems, Infrastructure of audio-visual services—Coding of moving video, Recommendation ITU-T H.264, Mar. 2009, 670 pages.
Tech et al., "MV-HEVC Draft Text 5", Joint Collaborative Team on 3D Video Coding Extension Development of ITU-T SG 16 WP 3 and ISO/IEC JTC 1/SC 29/WG 11, JCT3V-E1004-V6, 5th Meeting, Jul. 27-Aug. 2, 2013, 74 pages.
Corbera et al., "A Generalized Hypothetical Reference Decoder for H.264/AVC", IEEE Transactions on Circuits and Systems for Video Technology, vol. 13, No. 7, Jul. 2003, pp. 674-687.
Sjoberg et al., "Overview of HEVC High-Level Syntax and Reference Picture Management", IEEE Transactions on Circuits and Systems for Video Technology, vol. 22, No. 12, Dec. 2012, 14 pages.
"Video Coding for Low Bit Rate Communication", Series H: Audiovisual and Multimedia Systems Infrastructure of audiovisual services—Coding of moving video, ITU-T Recommendation H.263, Jan. 2005, 226 pages.
"Advanced Video Coding for Generic Audiovisual Services", Series H: Audiovisual and Multimedia Systems, Infrastructure of audio-visual services—Coding of moving video, Recommendation ITU-T H.264, Mar. 2010, 676 pages.
"High Efficiency Video Coding", Series H: Audiovisual and Multimedia Systems, Infrastructure of audiovisual services—Coding of moving video, Recommendation ITU-T H.265, Apr. 2013, 317 pages.
"Information Technology—Coding of Audio-Visual Objects—Part 15: Advanced Video Coding (AVC) File Format", ISO/IEC 14496-15, First edition, Apr. 15, 2004, 29 pages.
"Parameter Values for Ultra-High Definition Television Systems for Production and International Programme Exchange", Recommendation ITU-R BT.2020, Aug. 2012, 7 pages.
"Parameter Values for the HDTV Standards for Production and International Programme Exchange", Recommendation ITU-R BT.709-5, Apr. 2002, 32 pages.
Chen et al., "High Efficiency Video Coding (HEVC) Scalable Extension Draft 3", Joint Collaborative Team on Video Coding (JCT-VC) of ITU-T SG 16 WP 3 and ISO/IEC JTC 1/SC 29/WG 11, JCTVC-N1008_v3, 14th Meeting, Jul. 25-Aug. 2, 2013, 68 Pages.
Wang et al., "RTP Payload Format for H.264 Video", RFC 6184, Huawei Technologies, May, 2011, pp. 1-101.
Wenger et al., "RTP Payload Format for Scalable Video Coding", RFC 6190, Huawei Technologies, May, 2011, pp. 1-100.
Skupin et al. "MV-HEVC/SHVC HLS: Ultra-low delay with SHVC, MV-HEVC and 3D-HEVC", JCTVC=N0290/JCT3V-0098, Fraunhofer Heinrich Hertz Institute, Berlin Germany.
"Coding of Moving Pictures and Audio", International Orgainisation for Standardisation Organisation Internationale De Normalisation, ISO/IEC JTC1/SC29/WG11, Mar. 2003, Pattaya.
Extended European Search Report for corresponding European Application No. 14854798.7 dated May 9, 2017, 9 pages.
"Information technology—Coding of audio-visual objects—Part 10: Advanced Video Coding", ISO/IEC IS 14496-10, 7th edition May 1, 2012, 720 pages.
Office Action for European Application No. 14 772 128.6 dated Mar. 8, 2018, 4 pages (no translation available).
Office Action for European Application No. 14 772 128.6 dated Sep. 24, 2018, 5 pages (no translation available).
Decision to Grant for European Application No. 14 772 128.6 dated Mar. 14, 2019, 2 pages (no translation available).

* cited by examiner

APPARATUS, A METHOD AND A COMPUTER PROGRAM FOR VIDEO CODING AND DECODING

TECHNICAL FIELD

The present invention relates to an apparatus, a method and a computer program for video coding and decoding.

BACKGROUND

In video coding standards, a compliant bit stream must be able to be decoded by a hypothetical reference decoder that may be conceptually connected to the output of an encoder and consists of at least a pre-decoder buffer, a decoder and an output/display unit. This virtual decoder is known as the hypothetical reference decoder (HRD) in e.g. H.263, H.264/AVC and H.265/HEVC, and the video buffering verifier (VBV) e.g. in MPEG-4 Part 2. The virtual decoder and buffering verifier are collectively called as hypothetical reference decoder (HRD) in this document. A stream is compliant if it can be decoded by the HRD without buffer overflow or, in some cases, underflow. Buffer overflow happens if more bits are to be placed into the buffer when it is full. Buffer underflow happens if some bits are not in the buffer when said bits are to be fetched from the buffer for decoding/playback.

HRD models typically include instantaneous decoding, while the input bitrate to the coded picture buffer (CPB) of HRD may be regarded as a constraint for the encoder and the bitstream on decoding rate of coded data and a requirement for decoders for the processing rate. The CPB operates in a serial fashion, i.e. decodes data units, such as coded pictures or H.265/HEVC decoding units, in their decoding or bitstream order. Consequently, the HRD models do not support parallel processing, where more than one processing unit, such as a processor or a core in a multi-core processor, decodes data. Therefore, timing and/or bitrate information are only provided for serial processing considerations.

One of the motivations for the HRD is to avoid so-called evil bitstreams, which would consume such a large quantity of resources that practical decoder implementations would not be able to handle. However, with the serial processing considerations in the HRD make it impossible to ensure that a single processing unit within a parallel decoding arrangement including multiple processing units would not be loaded with an evil bitstream portion consuming too large a quantity of resources. Moreover, timing and delays are indicated for serial processing only, and said timing information as well as HRD buffer sizes is used in many decoder implementations. This makes it harder or impossible to use signalled HRD buffer sizes and timing information in decoder implementations using multiple processing units.

Therefore, there is a need for a more optimal method for utilizing the HRD models.

SUMMARY

A method according to a first aspect comprises
associating a first set of data units into a first bitstream partition and associating a second set of data units into a second bitstream partition, where the first set comprises data units different from those of the second set;
inputting the first bitstream partition into a first buffer;
inputting the second bitstream partition into a second buffer;
obtaining buffering parameters for at least one of the second bitstream partition and the second buffer; and
using the buffering parameters in at least one of inputting the second bitstream partition into the second buffer and outputting from the second buffer.

According to an embodiment, obtaining the buffering parameters further comprises
obtaining an initial arrival delay; and
starting the inputting the second bitstream partition into the second buffer when the initial arrival delay has elapsed.

According to an embodiment, inputting the second bitstream partition into the second buffer comprises
delaying inputting of a first data unit into the second buffer such that its removal time is smaller than or equal to the removal time of the last data unit of the data units of the first bitstream partition from the first buffer.

According to an embodiment, the method further comprises
encoding a nesting data structure indicating a bitstream partition; and
encoding the buffering parameters within the nesting data structure.

According to an embodiment, the nesting data structure is a bitstream partition nesting SEI message.

According to an embodiment, processing periods of the data units in the first and the second bitstream partition are overlapping.

According to an embodiment, the method further comprises
indicating in a sequence-level syntax structure, whether the bitstream contains buffering parameters for bitstream-partition-specific operations.

According to an embodiment, Video Usability Information (VUI) part of Video Parameter Set (VPS) comprises a syntax element indicating the number of bitstream partitions for which Hypothetical Reference Decoder (HRD) parameters are provided.

According to an embodiment, the method further comprises
indicating a plurality of ways for partitioning the same bitstream; and
providing HRD parameters for more than one partitioning.

According to an embodiment, the method further comprises
including bitstream-partition-specific HRD parameters in a sequence-level syntax structure, such as VPS.

According to an embodiment, the method further comprises
including a number of schedules in a sequence-level syntax structure, the sequence-level syntax structure further indicating a coded picture buffer (CPB) size and bitrate used for each bitstream partition.

An apparatus according to a second aspect comprises:
at least one processor and at least one memory, said at least one memory stored with code thereon, which when executed by said at least one processor, causes an apparatus to perform at least
associating a first set of data units into a first bitstream partition and associating a second set of data units into a second bitstream partition, where the first set comprises data units different from those of the second set;
inputting the first bitstream partition into a first buffer;
inputting the second bitstream partition into a second buffer;
obtaining buffering parameters for at least one of the second bitstream partition and the second buffer; and using the buffering parameters in at least one of inputting the second bitstream partition into the second buffer and outputting from the second buffer.

According to a third aspect there is provided a computer readable storage medium stored with code thereon for use by an apparatus, which when executed by a processor, causes the apparatus to perform:

associating a first set of data units into a first bitstream partition and associating a second set of data units into a second bitstream partition, where the first set comprises data units different from those of the second set;

inputting the first bitstream partition into a first buffer;

inputting the second bitstream partition into a second buffer;

obtaining buffering parameters for at least one of the second bitstream partition and the second buffer; and using the buffering parameters in at least one of inputting the second bitstream partition into the second buffer and outputting from the second buffer.

According to a fourth aspect there is provided a video decoder configured for decoding a bitstream comprising an image sequence, wherein said video decoder is further configured for:

associating a first set of data units into a first bitstream partition and associating a second set of data units into a second bitstream partition, where the first set comprises data units different from those of the second set;

inputting the first bitstream partition into a first buffer;

inputting the second bitstream partition into a second buffer;

obtaining buffering parameters for at least one of the second bitstream partition and the second buffer; and using the buffering parameters in at least one of inputting the second bitstream partition into the second buffer and outputting from the second buffer.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
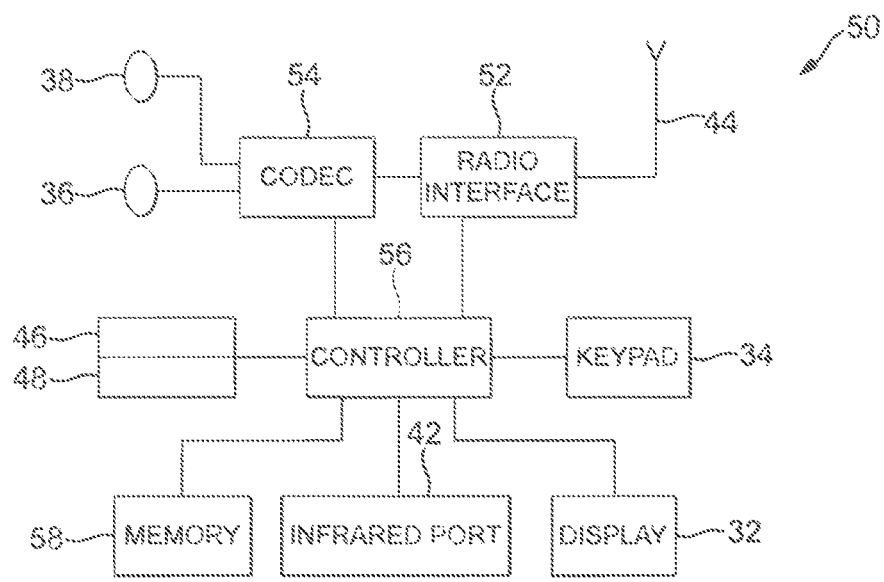
FIG. 1 shows schematically an electronic device employing some embodiments of the invention.
Figure 2:
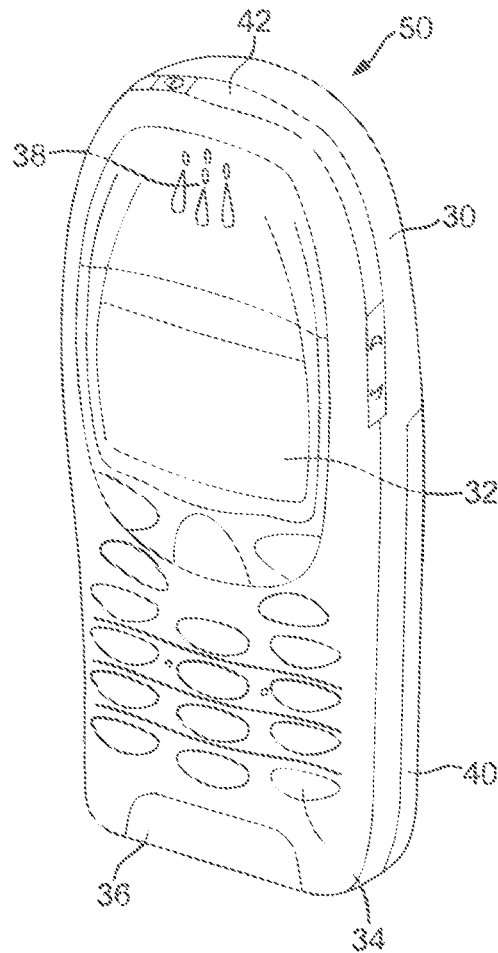
FIG. 2 shows schematically a user equipment suitable for employing some embodiments of the invention.

The following describes in further detail suitable apparatus and possible mechanisms for encoding an enhancement layer sub-picture without significantly sacrificing the coding efficiency. In this regard reference is first made to FIG. 1 which shows a schematic block diagram of an exemplary apparatus or electronic device 50, which may incorporate a codec according to an embodiment of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In other embodiments of the invention, the apparatus may receive the video image data for processing from another device prior to transmission and/or storage. In other embodiments of the invention, the apparatus 50 may receive either wirelessly or by a wired connection the image for coding/decoding.

Figure 3:
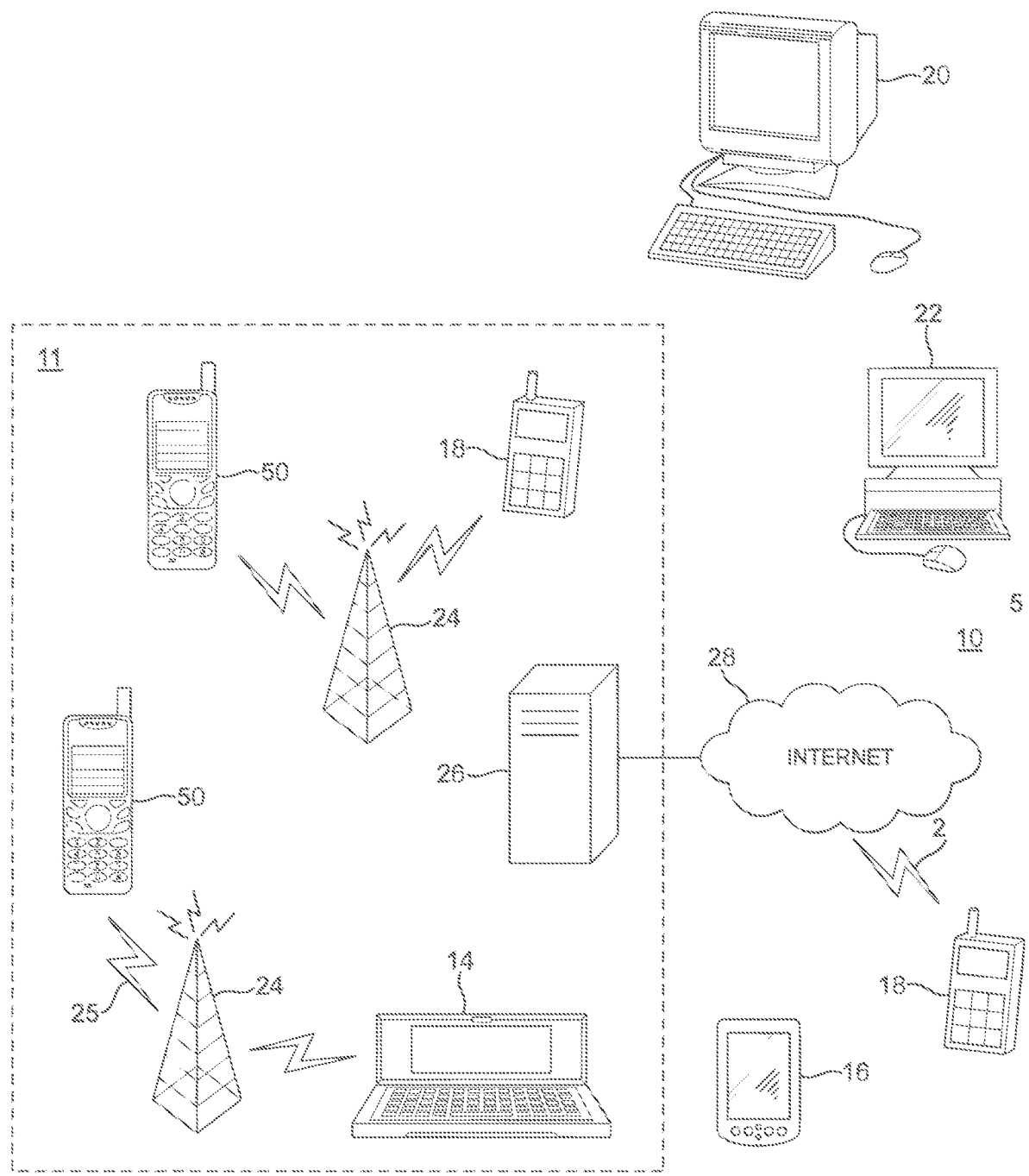
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Video codec consists of an encoder that transforms the input video into a compressed representation suited for storage/transmission and a decoder that can uncompress the compressed video representation back into a viewable form. Typically encoder discards some information in the original video sequence in order to represent the video in a more compact form (that is, at lower bitrate).

Typical hybrid video codecs, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
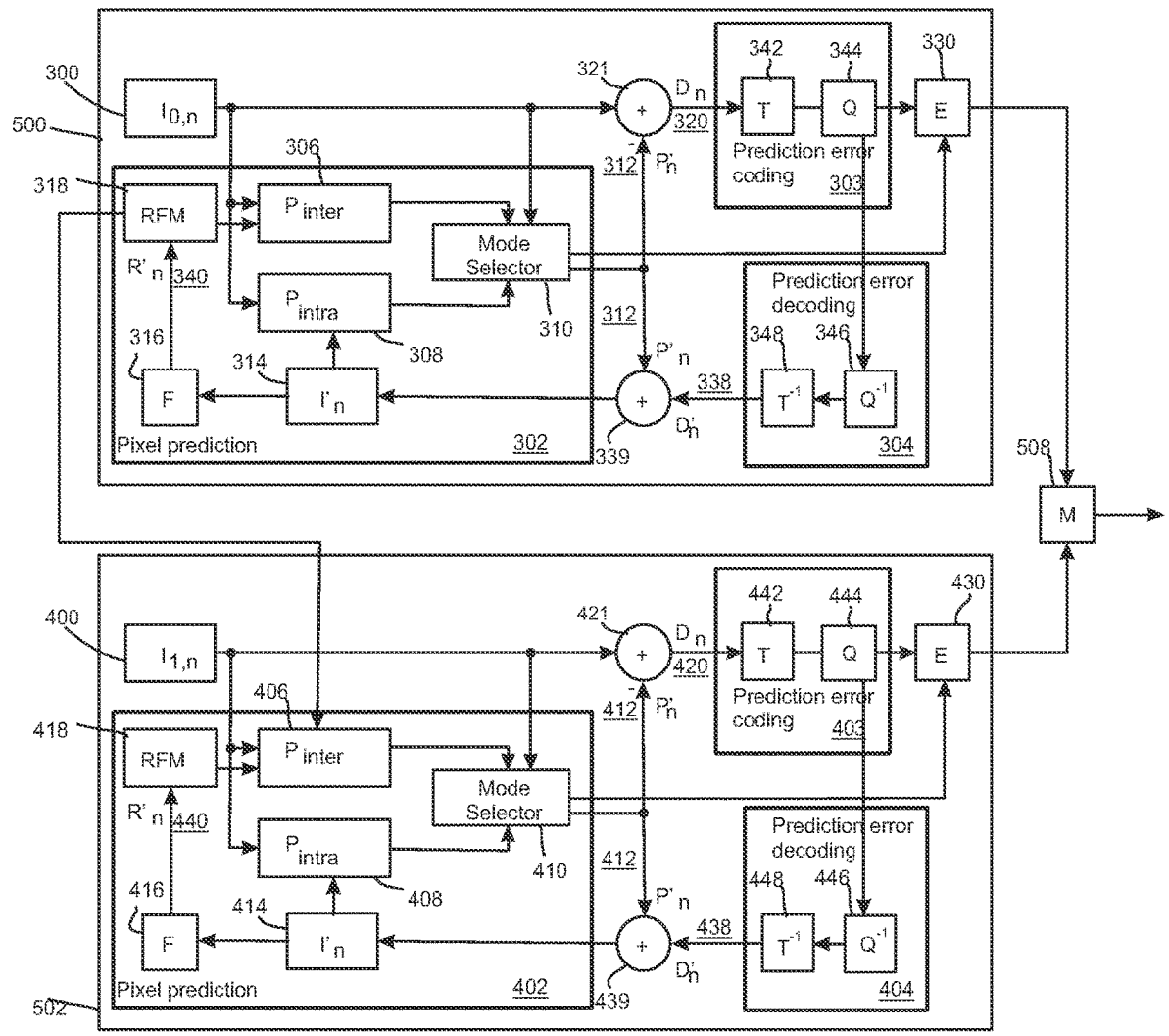
FIG. 4 shows schematically an encoder suitable for implementing some embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

The High Efficiency Video Coding (H.265/HEVC) standard was developed by the Joint Collaborative Team-Video Coding (JCT-VC) of VCEG and MPEG. The standard is or will be published by both parent standardization organizations, and it is referred to as ITU-T Recommendation H.265 and ISO/IEC International Standard 23008-2, also known as MPEG-H Part 2 High Efficiency Video Coding (HEVC). There are currently ongoing standardization projects to develop extensions to H.265/HEVC, including scalable, multiview, three-dimensional, and fidelity range extensions.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order. In the description of existing standards as well as in the description of example embodiments, a phrase "by external means" or "through external means" may be used. For example, an entity, such as a syntax structure or a value of a variable used in the decoding process, may be provided "by external means" to the decoding process. The phrase "by external means" may indicate that the entity is not included in the bitstream created by the encoder, but rather conveyed externally from the bitstream for example using a control protocol. It may alternatively or additionally mean that the entity is not created by the encoder, but may be created for example in the player or decoding control logic or alike that is using the decoder. The decoder may have an interface for inputting the external means, such as variable values.

A profile may be defined as a subset of the entire bitstream syntax that is specified by a decoding/coding standard or specification. Within the bounds imposed by the syntax of a given profile it is still possible to require a very large variation in the performance of encoders and decoders depending upon the values taken by syntax elements in the bitstream such as the specified size of the decoded pictures. In many applications, it might be neither practical nor economic to implement a decoder capable of dealing with all hypothetical uses of the syntax within a particular profile. In order to deal with this issue, levels may be used. A level may be defined as a specified set of constraints imposed on values of the syntax elements in the bitstream and variables specified in a decoding/coding standard or specification. These constraints may be simple limits on values. Alternatively or in addition, they may take the form of constraints on arithmetic combinations of values (e.g., picture width multiplied by picture height multiplied by number of pictures decoded per second). Other means for specifying constraints for levels may also be used. Some of the constraints specified in a level may for example relate to the maximum picture size, maximum bitrate and maximum data rate in terms of coding units, such as macroblocks, per a time period, such as a second. The same set of levels may be defined for all profiles. It may be preferable for example to increase interoperability of terminals implementing different profiles that most or all aspects of the definition of each level may be common across different profiles.

The elementary unit for the input to an H.264/AVC or HEVC encoder and the output of an H.264/AVC or HEVC decoder, respectively, is a picture. A picture given as an input to an encoder may also referred to as a source picture, and a picture decoded by a decoded may be referred to as a decoded picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

A partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

The directionality of a prediction mode for intra prediction, i.e. the prediction direction to be applied in a particular prediction mode, may be vertical, horizontal, diagonal. For example, in HEVC, intra prediction provides up to 33 directional prediction modes, depending on the size of PUs, and each of the intra prediction modes has a prediction direction assigned to it.

Similarly each TU is associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

Figure 5:
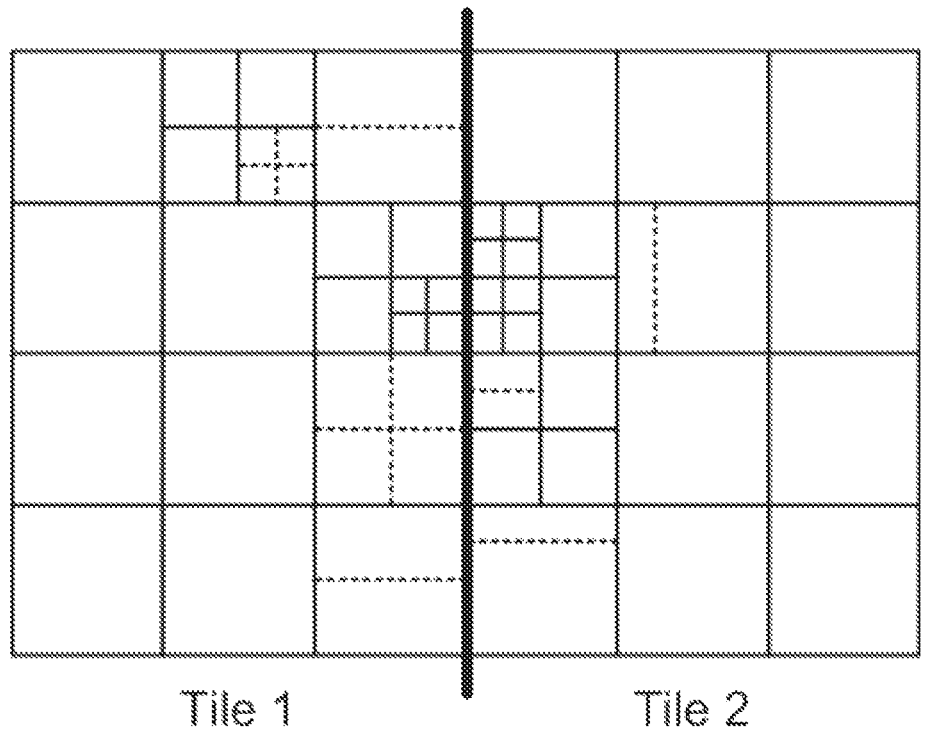
FIG. 5 shows an example of a picture consisting of two tiles.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In a draft HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order. FIG. 5 shows an example of a picture consisting of two tiles partitioned into square coding units (solid lines) which have been further partitioned into rectangular prediction units (dashed lines).

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF).

In SAO, a picture is divided into regions where a separate SAO decision is made for each region. The SAO information in a region is encapsulated in a SAO parameters adaptation unit (SAO unit) and in HEVC, the basic unit for adapting SAO parameters is CTU (therefore an SAO region is the block covered by the corresponding CTU).

In the SAO algorithm, samples in a CTU are classified according to a set of rules and each classified set of samples are enhanced by adding offset values. The offset values are signalled in the bitstream. There are two types of offsets: 1) Band offset 2) Edge offset. For a CTU, either no SAO or band offset or edge offset is employed. Choice of whether no SAO or band or edge offset to be used may be decided by the encoder with e.g. rate distortion optimization (RDO) and signaled to the decoder.

In the band offset, the whole range of sample values is in some embodiments divided into 32 equal-width bands. For example, for 8-bit samples, width of a band is 8 (=256/32). Out of 32 bands, 4 of them are selected and different offsets are signalled for each of the selected bands. The selection decision is made by the encoder and may be signalled as follows: The index of the first band is signalled and then it is inferred that the following four bands are the chosen ones. The band offset may be useful in correcting errors in smooth regions.

In the edge offset type, the edge offset (EO) type may be chosen out of four possible types (or edge classifications) where each type is associated with a direction: 1) vertical, 2) horizontal, 3) 135 degrees diagonal, and 4) 45 degrees diagonal. The choice of the direction is given by the encoder and signalled to the decoder. Each type defines the location of two neighbour samples for a given sample based on the angle. Then each sample in the CTU is classified into one of five categories based on comparison of the sample value against the values of the two neighbour samples. The five categories are described as follows:

1. Current sample value is smaller than the two neighbour samples
2. Current sample value is smaller than one of the neighbors and equal to the other neighbor
3. Current sample value is greater than one of the neighbors and equal to the other neighbor
4. Current sample value is greater than two neighbour samples
5. None of the above These five categories are not required to be signalled to the decoder because the classification is based on only reconstructed samples, which may be available and identical in both the encoder and decoder. After each sample in an edge offset type CTU is classified as one of the five categories, an offset value for each of the first four categories is determined and signalled to the decoder. The offset for each category is added to the sample values associated with the corresponding category. Edge offsets may be effective in correcting ringing artifacts.

The SAO parameters may be signalled as interleaved in CTU data. Above CTU, slice header contains a syntax element specifying whether SAO is used in the slice. If SAO is used, then two additional syntax elements specify whether SAO is applied to Cb and Cr components. For each CTU, there are three options: 1) copying SAO parameters from the left CTU, 2) copying SAO parameters from the above CTU, or 3) signalling new SAO parameters.

The adaptive loop filter (ALF) is another method to enhance quality of the reconstructed samples. This may be achieved by filtering the sample values in the loop. In some embodiments the encoder determines which region of the pictures are to be filtered and the filter coefficients based on e.g. RDO and this information is signalled to the decoder.

In typical video codecs the motion information is indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

Typical video codecs enable the use of uni-prediction, where a single prediction block is used for a block being (de)coded, and bi-prediction, where two prediction blocks are combined to form the prediction for a block being (de)coded. Some video codecs enable weighted prediction, where the sample values of the prediction blocks are weighted prior to adding residual information. For example, multiplicative weighting factor and an additive offset which can be applied. In explicit weighted prediction, enabled by some video codecs, a weighting factor and offset may be coded for example in the slice header for each allowable reference picture index. In implicit weighted prediction, enabled by some video codecs, the weighting factors and/or offsets are not coded but are derived e.g. based on the relative picture order count (POC) distances of the reference pictures.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C=D+\lambda R, \qquad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

The elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit. In H.264/AVC, the NAL unit header indicates whether a coded slice contained in the NAL unit is a part of a reference picture or a non-reference picture.

H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The header for SVC and MVC NAL units may additionally contain various indications related to the scalability and multiview hierarchy.

In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit reserved field (callednuh_layer_id). The temporal_id_plus 1 syntax element may be regarded as a temporal identifier for the NAL unit, and a zero-based Temporand variable may be derived as follows: Temporand=temporal_id_plus1−1. TemporalId equal to 0 corresponds to the lowest temporal level. The value of temporal_id_plus 1 is required to be non-zero in order to avoid start code emulation involving the two NAL unit header bytes.

The six-bit reserved field is expected to be used by extensions such as a future scalable and 3D video extension. It is expected that these six bits would carry information on the scalability hierarchy, such as quality_id or similar, dependency_id or similar, any other type of layer identifier, view order index or similar, view identifier, an identifier similar to priority_id of SVC indicating a valid sub-bit-stream extraction if all NAL units greater than a specific identifier value are removed from the bitstream. Without loss of generality, in some example embodiments a variable LayerId is derived from the value of reserved_zero_6 bits for example as follows: LayerId=reserved_zero_6 bits.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, coded slice NAL units contain syntax elements representing one or more CU.

In H.264/AVC, a coded slice NAL unit can be indicated to be a coded slice in an Instantaneous Decoding Refresh (IDR) picture or coded slice in a non-IDR picture.

In HEVC, a coded slice NAL unit can be indicated to be one of the following types:

| nal_unit_type | Name of nal_unit_type | Content of NAL unit and RBSP syntax structure |
|---|---|---|
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved // reserved non-RAP non-reference VCL NAL unit types |
| 11, 13, 15 | RSV_VCL_R11 RSV_VCL_R13 RSV_VCL_R15 | Reserved // reserved non-RAP reference VCL NAL unit types |
| 16, 17, 18 | BLA_W_LP BLA_W_DLP (a.k.a. BLA_N_LP | Coded slice segment of a BLA picture slice_segment_layer_rbsp( ) |
| 19, 20 | IDR_W_DLP (a.k.a. IDR_W_RADL) IDR_N_LP | Coded slice segment of an IDR picture slice_segment_layer_rbsp( ) |
| 21 | CRA_NUT | Coded slice segment of a CRA picture slice_segment_layer_rbsp( ) |
| 22, 23 | RSV_IRAP_VCL22.. RSV_IRAP_VCL23 | Reserved // reserved RAP VCL NAL unit types |
| 24 . . . 31 | RSV_VCL24.. RSV_VCL31 | Reserved // reserved non-RAP VCL NAL unit types |

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture, is a picture where each slice or slice segment has nal_unit_type in the range of 16 to 23, inclusive. A RAP picture contains only intra-coded slices, and may be a BLA picture, a CRA picture or an IDR picture. The first picture in the bitstream is a RAP picture. Provided the necessary parameter sets are available when they need to be activated, the RAP picture and all subsequent non-RASL pictures in decoding order can be correctly decoded without performing the decoding process of any pictures that precede the RAP picture in decoding order. There may be pictures in a bitstream that contain only intra-coded slices that are not RAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture is either a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some drafts of the HEVC standard, a RADL picture was referred to a Decodable Leading Picture (DLP).

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in HEVC, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In a draft HEVC standard, there was also a third type of parameter sets, here referred to as an Adaptation Parameter Set (APS), which includes parameters that are likely to be unchanged in several coded slices but may change for example for each picture or each few pictures. In a draft HEVC, the APS syntax structure includes parameters or syntax elements related to quantization matrices (QM), adaptive sample offset (SAO), adaptive loop filtering (ALF), and deblocking filtering. In a draft HEVC, an APS is a NAL unit and coded without reference or prediction from any other NAL unit. An identifier, referred to as aps_id syntax element, is included in APS NAL unit, and included and used in the slice header to refer to a particular APS. In another draft HEVC standard, an APS syntax structure only contains ALF parameters. In a draft HEVC standard, an adaptation parameter set RBSP includes parameters that can be referred to by the coded slice NAL units of one or more coded pictures when at least one of sample_adaptive_offset_enabled_flag or adaptive_loop_filter_enabled_flag are equal to 1. In the final published HEVC, the APS syntax structure was removed from the specification text.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. In a scalable extension of HEVC, VPS may for example include a mapping of the LayerId value derived from the NAL unit header to one or more scalability dimension values, for example correspond to dependency_id, quality_id, view_id, and depth_flag for the layer defined similarly to SVC and MVC. VPS may include profile and level information for one or more layers as well as the profile and/or level for one or more temporal sub-layers (consisting of VCL NAL units at and below certain temporal_id values) of a layer representation.

H.264/AVC and HEVC syntax allows many instances of parameter sets, and each instance is identified with a unique identifier. In order to limit the memory usage needed for parameter sets, the value range for parameter set identifiers has been limited. In H.264/AVC and HEVC, each slice header includes the identifier of the picture parameter set that is active for the decoding of the picture that contains the slice, and each picture parameter set contains the identifier of the active sequence parameter set. In a draft HEVC standard, a slice header additionally contains an APS identifier, although in the published HEVC standard the APS identifier was removed from the slice header. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

A parameter set may be activated by a reference from a slice or from another active parameter set or in some cases from another syntax structure such as a buffering period SEI message.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

Several nesting SEI messages have been specified in the AVC and HEVC standards or proposed otherwise. The idea of nesting SEI messages is to contain one or more SEI messages within a nesting SEI message and provide a mechanism for associating the contained SEI messages with a subset of the bitstream and/or a subset of decoded data. It may be required that a nesting SEI message contains one or more SEI messages that are not nesting SEI messages themselves. An SEI message contained in a nesting SEI message may be referred to as a nested SEI message. An SEI message not contained in a nesting SEI message may be referred to as a non-nested SEI message. The scalable nesting SEI message of HEVC enables to identify either a bitstream subset (resulting from a sub-bitstream extraction process) or a set of layers to which the nested SEI messages apply. A bitstream subset may also be referred to as a sub-bitstream.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In HEVC, no redundant coded picture has been specified.

In H.264/AVC, an access unit (AU) comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In HEVC, an access unit (AU) may be defined as a set of NAL units that are associated with each other according to a specified classification rule, are consecutive in decoding order, and contain exactly one coded picture. In addition to containing the VCL NAL units of the coded picture, an access unit may also contain non-VCL NAL units. The decoding of an access unit always results in a decoded picture.

In H.264/AVC, a coded video sequence is defined to be a sequence of consecutive access units in decoding order from an IDR access unit, inclusive, to the next IDR access unit, exclusive, or to the end of the bitstream, whichever appears earlier. In HEVC, a coded video sequence is defined to be a sequence of access units that consists, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CRA NAL unit type, can be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may be considered to start from an IDR access unit. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In HEVC, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr( ) (a.k.a. RefPicSetStCurrBefore), RefPicSetStCurr1 (a.k.a. RefPicSetStCurrAfter), RefPicSetStFoll0, RefPicSetStFoll1, RefPicSetLtCurr, and RefPicSetLtFoll. RefPicSetStFoll0 and RefPicSetStFoll1 may also be considered to form jointly one subset RefPicSetStFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr( ), RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a reference picture set may be specified in a sequence parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. A reference picture set may be coded independently or may be predicted from another reference picture set (known as inter-RPS prediction). When a reference picture set is independently coded, the syntax structure includes up to three loops iterating over different types of reference pictures; short-term reference pictures with lower POC value than the current picture, short-term reference pictures with higher POC value than the current picture and long-term reference pictures. Each loop entry specifies a picture to be marked as "used for reference". In general, the picture is specified with a differential POC value. The inter-RPS prediction exploits the fact that the reference picture set of the current picture can be predicted from the reference picture set of a previously decoded picture. This is because all the reference pictures of the current picture are either reference pictures of the previous picture or the previously decoded picture itself. It is only necessary to indicate which of these pictures should be reference pictures and be used for the prediction of the current picture. In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice. In addition, for a B slice in a draft HEVC standard, a combined list (List C) is constructed after the final reference picture lists (List 0 and List 1) have been constructed. The combined list may be used for uni-prediction (also known as uni-directional prediction) within B slices. In the published HEVC standard, the combined list was removed.

A reference picture list, such as reference picture list 0 and reference picture list 1, is typically constructed in two steps: First, an initial reference picture list is generated. The initial reference picture list may be generated for example on the basis of frame_num, POC, temporal_id, or information on the prediction hierarchy such as GOP structure, or any combination thereof. Second, the initial reference picture list may be reordered by reference picture list reordering (RPLR) commands, also known as reference picture list modification syntax structure, which may be contained in slice headers. In H.264/AVC, the RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. In HEVC, the initial reference picture lists may be modified through the reference picture list modification syntax structure, where pictures in the initial reference picture lists may be identified through an entry index to the list. In other words, in HEVC, reference picture list modification is encoded into a syntax structure comprising a loop over each entry in the final reference picture list, where each loop entry is a fixed-length coded index to the initial reference picture list and indicates the picture in ascending position order in the final reference picture list.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

Figure 6:
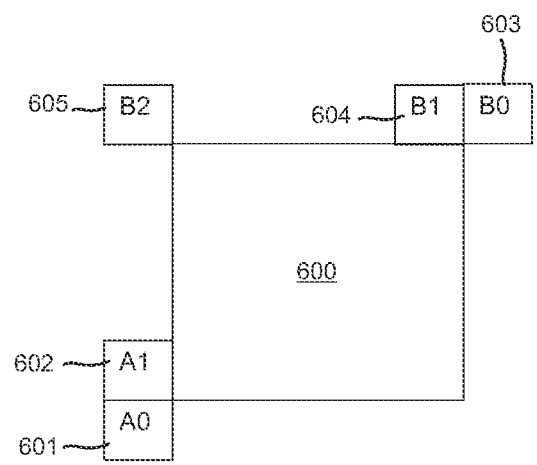
FIG. 6 shows an example of a current block and five spatial neighbors usable as motion prediction candidates.

The advanced motion vector prediction (AMVP) or alike may operate for example as follows, while other similar realizations of advanced motion vector prediction are also possible for example with different candidate position sets and candidate locations with candidate position sets. Two spatial motion vector predictors (MVPs) may be derived and a temporal motion vector predictor (TMVP) may be derived. They may be selected among the positions shown in FIG. 6: three spatial motion vector predictor candidate positions 603, 604, 605 located above the current prediction block 600 (B0, B1, B2) and two 601, 602 on the left (A0, A1). The first motion vector predictor that is available (e.g. resides in the same slice, is inter-coded, etc.) in a pre-defined order of each candidate position set, (B0, B1, B2) or (A0, A1), may be selected to represent that prediction direction (up or left) in the motion vector competition. A reference index for the temporal motion vector predictor may be indicated by the encoder in the slice header (e.g. as a collocated_ref_idx syntax element). The motion vector obtained from the co-located picture may be scaled according to the proportions of the picture order count differences of the reference picture of the temporal motion vector predictor, the co-located picture, and the current picture. Moreover, a redundancy check may be performed among the candidates to remove identical candidates, which can lead to the inclusion of a zero motion vector in the candidate list. The motion vector predictor may be indicated in the bitstream for example by indicating the direction of the spatial motion vector predictor (up or left) or the selection of the temporal motion vector predictor candidate.

Many high efficiency video codecs such as HEVC codec employ an additional motion information coding/decoding mechanism, often called merging/merge mode/process/mechanism, where all the motion information of a block/PU is predicted and used without any modification/correction. The aforementioned motion information for a PU may comprise one or more of the following: 1) The information whether 'the PU is uni-predicted using only reference picture list0' or 'the PU is uni-predicted using only reference picture list1' or 'the PU is bi-predicted using both reference picture list0 and list1'; 2) Motion vector value corresponding to the reference picture list0, which may comprise a horizontal and vertical motion vector component; 3) Reference picture index in the reference picture list0 and/or an identifier of a reference picture pointed to by the motion vector corresponding to reference picture list0, where the identifier of a reference picture may be for example a picture order count value, a layer identifier value (for inter-layer prediction), or a pair of a picture order count value and a layer identifier value; 4) Information of the reference picture marking of the reference picture, e.g. information whether the reference picture was marked as "used for short-term reference" or "used for long-term reference"; 5)-7) The same as 2)-4), respectively, but for reference picture list 1. Similarly, predicting the motion information is carried out using the motion information of adjacent blocks and/or co-located blocks in temporal reference pictures. A list, often called as a merge list, may be constructed by including motion prediction candidates associated with available adjacent/co-located blocks and the index of selected motion prediction candidate in the list is signalled and the motion information of the selected candidate is copied to the motion information of the current PU. When the merge mechanism is employed for a whole CU and the prediction signal for the CU is used as the reconstruction signal, i.e. prediction residual is not processed, this type of coding/decoding the CU is typically named as skip mode or merge based skip mode. In addition to the skip mode, the merge mechanism may also be employed for individual PUs (not necessarily the whole CU as in skip mode) and in this case, prediction residual may be utilized to improve prediction quality. This type of prediction mode is typically named as an inter-merge mode.

One of the candidates in the merge list may be a TMVP candidate, which may be derived from the collocated block within an indicated or inferred reference picture, such as the reference picture indicated for example in the slice header for example using the collocated_ref_idx syntax element or alike.

In HEVC the so-called target reference index for temporal motion vector prediction in the merge list is set as 0 when the motion coding mode is the merge mode. When the motion coding mode in HEVC utilizing the temporal motion vector prediction is the advanced motion vector prediction mode, the target reference index values are explicitly indicated (e.g. per each PU).

When the target reference index value has been determined, the motion vector value of the temporal motion vector prediction may be derived as follows: Motion vector at the block that is co-located with the bottom-right neighbor of the current prediction unit is calculated. The picture where the co-located block resides may be e.g. determined according to the signalled reference index in the slice header as described above. The determined motion vector at the co-located block is scaled with respect to the ratio of a first picture order count difference and a second picture order count difference. The first picture order count difference is derived between the picture containing the co-located block and the reference picture of the motion vector of the co-located block. The second picture order count difference is derived between the current picture and the target reference picture. If one but not both of the target reference picture and the reference picture of the motion vector of the co-located block is a long-term reference picture (while the other is a short-term reference picture), the TMVP candidate may be considered unavailable. If both of the target reference picture and the reference picture of the motion vector of the co-located block are long-term reference pictures, no POC-based motion vector scaling may be applied.

In the HEVC, several improvements have been made to enable the codec to better utilize parallelism, i.e. parallel processing of encoding and/or decoding tasks, thus more efficiently utilizing modern multi-core processor architectures. While slices in principle can be used to parallelize the decoder, employing slices for parallelism typically results in relatively poor coding efficiency. The concept of wavefront processing has been introduced to HEVC to improve the utilization of parallelism.

To enable wavefront processing, the encoder and/or the decoder uses the CABAC state of the second CTU of the previous CTU row as the initial CABAC state of the current CTU row. Hence, the processing of the current CTU row can be started when the processing of the second CTU of the previous CTU has been finished. Thanks to this property, CTU rows can be processed in a parallel fashion. In general, it may be pre-defined e.g. in a coding standard which CTU is used for transferring the entropy (de)coding state of the previous row of CTUs or it may be determined and indicated in the bitstream by the encoder and/or decoded from the bitstream by the decoder.

The wavefront processing in HEVC may be used in two parallelization approaches, Wavefront Parallel Processing (WPP) and Overlapped Wavefront (OWF). WPP allows creating picture partitions that can be processed in parallel without incurring high coding losses.

WPP processes rows of coding tree units (CTU) in parallel while preserving all coding dependencies. In WPP, entropy coding, predictive coding as well as in-loop filtering can be applied in a single processing step, which makes the implementations of WPP rather straightforward. OWF, in turn, enables to overlap the execution of consecutive pictures. When the processing of a coding tree unit row in the current picture has been finished and no more rows are available, the processing of the next picture can be started instead of waiting for the current picture to finish.

When a coded picture has been constrained for wavefront processing or when tiles have been used, CTU rows or tiles (respectively) may be byte-aligned in the bitstream and may be preceded by a start code. Additionally, entry points may be provided in the bitstream (e.g. in the slice header) and/or externally (e.g. in a container file). An entry point is a byte pointer or a byte count or a similar straightforward reference mechanism to the start of a CTU row (for wavefront-enabled coded pictures) or a tile. In HEVC, entry points may be specified using entry_point_offset_minus1[i] of the slice header. In the HEVC file format (ISO/IEC 14496-15), the sub-sample information box may provide the information of entry points. In some scenarios, the use of dependent slice segments may be useful instead of or in addition to entry points. A dependent slice segment may be formed for example for a CTU row when a coded picture is constrained for wavefront processing and consequently the start of the dependent slice segment NAL unit may be used to determine CTU row boundaries.

Scalable video coding refers to coding structure where one bitstream can contain multiple representations of the content at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance the temporal resolution (i.e., the frame rate), the spatial resolution, or simply the quality of the video content represented by another layer or part thereof. Each layer together with all its dependent layers is one representation of the video signal at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Some coding standards allow creation of scalable bit streams. A meaningful decoded representation can be produced by decoding only certain parts of a scalable bit stream. Scalable bit streams can be used for example for rate adaptation of pre-encoded unicast streams in a streaming server and for transmission of a single bit stream to terminals having different capabilities and/or with different network conditions. A list of some other use cases for scalable video coding can be found in the ISO/IEC JTC1 SC29 WG11 (MPEG) output document N5540, "Applications and Requirements for Scalable Video Coding", the $64^{th}$ MPEG meeting, Mar. 10 to 14, 2003, Pattaya, Thailand.

A coding standard may include a sub-bitstream extraction process, and such is specified for example in SVC, MVC, and HEVC. The sub-bitstream extraction process relates to converting a bitstream, typically by removing NAL units, to a sub-bitstream, which may also be referred to as a bitstream subset. The sub-bitstream still remains conforming to the standard. For example, in HEVC, the bitstream created by excluding all VCL NAL units having a TemporalId value greater than a selected value and including all other VCL NAL units remains conforming. In HEVC, the sub-bitstream extraction process takes a TemporalId and/or a list of nuh_layer_id values as input and derives a sub-bitstream (also known as a bitstream subset) by removing from the bitstream all NAL units with TemporalId greater than the input TemporalId value or nuh_layer_id value not among the values in the input list of nuh_layer_id values.

A coding standard or system may refer to a term operation point or alike, which may indicate the scalable layers and/or sub-layers under which the decoding operates and/or may be associated with a sub-bitstream that includes the scalable layers and/or sub-layers being decoded. Some non-limiting definitions of an operation point are provided in the following.

In HEVC, an operation point is defined as bitstream created from another bitstream by operation of the sub-bitstream extraction process with the another bitstream, a target highest TemporalId, and a target layer identifier list as inputs.

In SHVC and MV-HEVC, an operation point definition may include a consideration a target output layer set. In SHVC and MV-HEVC, an operation point may be defined as A bitstream that is created from another bitstream by operation of the sub-bitstream extraction process with the another bitstream, a target highest TemporalId, and a target layer identifier list as inputs, and that is associated with a set of target output layers.

In MVC, an operation point may be defined as follows: An operation point is identified by a temporal_id value representing the target temporal level and a set of view_id values representing the target output views. One operation point is associated with a bitstream subset, which consists of the target output views and all other views the target output views depend on, that is derived using the sub-bitstream extraction process with tIdTarget equal to the temporal_id value and viewIdTargetList consisting of the set of view_id values as inputs. More than one operation point may be associated with the same bitstream subset. When "an operation point is decoded", a bitstream subset corresponding to the operation point may be decoded and subsequently the target output views may be output.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS).

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, block partitioning, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer.

SVC specifies a concept known as single-loop decoding. It is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use constrained intra-prediction (e.g., having the syntax element "constrained_intra_pred_flag" equal to 1). In single-loop decoding, the decoder performs motion compensation and full picture reconstruction only for the scalable layer desired for playback (called the "desired layer" or the "target layer"), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer.

A single decoding loop is needed for decoding of most pictures, while a second decoding loop is selectively applied to reconstruct the base representations, which are needed as prediction references but not for output or display, and are reconstructed only for the so called key pictures (for which "store_ref_base_pic_flag" is equal to 1).

FGS was included in some draft versions of the SVC standard, but it was eventually excluded from the final SVC standard. FGS is subsequently discussed in the context of some draft versions of the SVC standard. The scalability provided by those enhancement layers that cannot be truncated is referred to as coarse-grained (granularity) scalability (CGS). It collectively includes the traditional quality (SNR) scalability and spatial scalability. The SVC standard supports the so-called medium-grained scalability (MGS), where quality enhancement pictures are coded similarly to SNR scalable layer pictures but indicated by high-level syntax elements similarly to FGS layer pictures, by having the quality_id syntax element greater than 0.

The scalability structure in SVC may be characterized by three syntax elements: "temporal_id," "dependency_id" and "quality_id." The syntax element "temporal_id" is used to indicate the temporal scalability hierarchy or, indirectly, the frame rate. A scalable layer representation comprising pictures of a smaller maximum "temporal_id" value has a smaller frame rate than a scalable layer representation comprising pictures of a greater maximum "temporal_id". A given temporal layer typically depends on the lower temporal layers (i.e., the temporal layers with smaller "temporal_id" values) but does not depend on any higher temporal layer. The syntax element "dependency_id" is used to indicate the CGS inter-layer coding dependency hierarchy (which, as mentioned earlier, includes both SNR and spatial scalability). At any temporal level location, a picture of a smaller "dependency_id" value may be used for inter-layer prediction for coding of a picture with a greater "dependency_id" value. The syntax element "quality_id" is used to indicate the quality level hierarchy of a FGS or MGS layer. At any temporal location, and with an identical "dependency_id" value, a picture with "quality_id" equal to QL uses the picture with "quality_id" equal to QL-1 for inter-layer prediction. A coded slice with "quality_id" larger than 0 may be coded as either a truncatable FGS slice or a non-truncatable MGS slice.

For simplicity, all the data units (e.g., Network Abstraction Layer units or NAL units in the SVC context) in one access unit having identical value of "dependency_id" are referred to as a dependency unit or a dependency representation. Within one dependency unit, all the data units having identical value of "quality_id" are referred to as a quality unit or layer representation.

A base representation, also known as a decoded base picture, is a decoded picture resulting from decoding the Video Coding Layer (VCL) NAL units of a dependency unit having "quality_id" equal to 0 and for which the "store_ref_base_pic_flag" is set equal to 1. An enhancement representation, also referred to as a decoded picture, results from the regular decoding process in which all the layer representations that are present for the highest dependency representation are decoded.

As mentioned earlier, CGS includes both spatial scalability and SNR scalability. Spatial scalability is initially designed to support representations of video with different resolutions. For each time instance, VCL NAL units are coded in the same access unit and these VCL NAL units can correspond to different resolutions. During the decoding, a low resolution VCL NAL unit provides the motion field and residual which can be optionally inherited by the final decoding and reconstruction of the high resolution picture. When compared to older video compression standards, SVC's spatial scalability has been generalized to enable the base layer to be a cropped and zoomed version of the enhancement layer.

MGS quality layers are indicated with "quality_id" similarly as FGS quality layers. For each dependency unit (with the same "dependency_id"), there is a layer with "quality_id" equal to 0 and there can be other layers with "quality_id" greater than 0. These layers with "quality_id" greater than 0 are either MGS layers or FGS layers, depending on whether the slices are coded as truncatable slices.

In the basic form of FGS enhancement layers, only inter-layer prediction is used. Therefore, FGS enhancement layers can be truncated freely without causing any error propagation in the decoded sequence. However, the basic form of FGS suffers from low compression efficiency. This issue arises because only low-quality pictures are used for inter prediction references. It has therefore been proposed that FGS-enhanced pictures be used as inter prediction references. However, this may cause encoding-decoding mismatch, also referred to as drift, when some FGS data are discarded.

One feature of a draft SVC standard is that the FGS NAL units can be freely dropped or truncated, and a feature of the SVC standard is that MGS NAL units can be freely dropped (but cannot be truncated) without affecting the conformance of the bitstream. As discussed above, when those FGS or MGS data have been used for inter prediction reference during encoding, dropping or truncation of the data would result in a mismatch between the decoded pictures in the decoder side and in the encoder side. This mismatch is also referred to as drift.

To control drift due to the dropping or truncation of FGS or MGS data, SVC applied the following solution: In a certain dependency unit, a base representation (by decoding only the CGS picture with "quality_id" equal to 0 and all the dependent-on lower layer data) is stored in the decoded picture buffer. When encoding a subsequent dependency unit with the same value of "dependency_id," all of the NAL units, including FGS or MGS NAL units, use the base representation for inter prediction reference. Consequently, all drift due to dropping or truncation of FGS or MGS NAL units in an earlier access unit is stopped at this access unit. For other dependency units with the same value of "dependency_id," all of the NAL units use the decoded pictures for inter prediction reference, for high coding efficiency.

Each NAL unit includes in the NAL unit header a syntax element "use_ref base_pic_flag." When the value of this element is equal to 1, decoding of the NAL unit uses the base representations of the reference pictures during the inter prediction process. The syntax element "store_ref_base_pic_flag" specifies whether (when equal to 1) or not (when equal to 0) to store the base representation of the current picture for future pictures to use for inter prediction.

NAL units with "quality_id" greater than 0 do not contain syntax elements related to reference picture lists construction and weighted prediction, i.e., the syntax elements "num_refactive_1x_minus1" (x=0 or 1), the reference picture list reordering syntax table, and the weighted prediction syntax table are not present. Consequently, the MGS or FGS layers have to inherit these syntax elements from the NAL units with "quality_id" equal to 0 of the same dependency unit when needed.

In SVC, a reference picture list consists of either only base representations (when "use_ref base_pic_flag" is equal to 1) or only decoded pictures not marked as "base representation" (when "use_ref base_pic_flag" is equal to 0), but never both at the same time.

A scalable video codec for quality scalability (also known as Signal-to-Noise or SNR) and/or spatial scalability may be implemented as follows. For a base layer, a conventional non-scalable video encoder and decoder are used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and indicate its use typically with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

In addition to quality scalability following scalability modes exist:
  Spatial scalability: Base layer pictures are coded at a higher resolution than enhancement layer pictures.
  Bit-depth scalability: Base layer pictures are coded at lower bit-depth (e.g. 8 bits) than enhancement layer pictures (e.g. 10 or 12 bits).
  Chroma format scalability: Base layer pictures provide lower fidelity in chroma (e.g. coded in 4:2:0 chroma format) than enhancement layer pictures (e.g. 4:4:4 format).
  Color gamut scalability, where the enhancement layer pictures have a richer/broader color representation range than that of the base layer pictures—for example the enhancement layer may have UHDTV (ITU-R BT.2020) color gamut and the base layer may have the ITU-R BT.709 color gamut.

In all of the above scalability cases, base layer information could be used to code enhancement layer to minimize the additional bitrate overhead.

Another categorization of scalable coding is based on whether the same or different coding standard or technology is used as the basis for the base layer and enhancement layers. Terms hybrid codec scalability or standards scalability may be used to indicate a scenario where one coding standard or system is used for some layers, while another coding standard or system is used for some other layers. For example, the base layer may be AVC-coded, while one or more enhancement layers may be coded with an HEVC extension, such as SHVC or MV-HEVC.

Scalability can be enabled in two basic ways. Either by introducing new coding modes for performing prediction of pixel values or syntax from lower layers of the scalable representation or by placing the lower layer pictures to the reference picture buffer (decoded picture buffer, DPB) of the higher layer. The first approach is more flexible and thus can provide better coding efficiency in most cases. However, the second, reference frame based scalability, approach can be implemented very efficiently with minimal changes to single layer codecs while still achieving majority of the coding efficiency gains available. It may be possible to implement a reference frame based scalability codec by utilizing the same hardware or software implementation for all the layers.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

A scalable video encoder e.g. for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded.

Work is ongoing to specify scalable and multiview extensions to the HEVC standard. The multiview extension of HEVC, referred to as MV-HEVC, is similar to the MVC extension of H.264/AVC. Similarly to MVC, in MV-HEVC, inter-view reference pictures can be included in the reference picture list(s) of the current picture being coded or decoded. The scalable extension of HEVC, referred to as SHVC, is planned to be specified so that it uses multi-loop decoding operation (unlike the SVC extension of H.264/AVC). SHVC uses a reference index based design, where an inter-layer reference picture can be included in a one or more reference picture lists of the current picture being coded or decoded (as described above). In an earlier draft of SHVC another design was also investigated, which may be referred to as IntraBL or TextureRL, where a specific coding mode, e.g. in CU level, is used for using decoded/reconstructed sample values of a reference layer picture for prediction in an enhancement layer picture. The SHVC development has concentrated on development of spatial and coarse grain quality scalability.

It is possible to use many of the same syntax structures, semantics, and decoding processes for MV-HEVC and reference-index-based SHVC. Furthermore, it is possible to use the same syntax structures, semantics, and decoding processes for depth coding too. Hereafter, term scalable multiview extension of HEVC (SMV-HEVC) is used to refer to a coding process, a decoding process, syntax, and semantics where largely the same (de)coding tools are used regardless of the scalability type and where the reference index based approach without changes in the syntax, semantics, or decoding process below the slice header is used. SMV-HEVC might not be limited to multiview, spatial, and coarse grain quality scalability but may also support other types of scalability, such as depth-enhanced video.

For the enhancement layer coding, the same concepts and coding tools of HEVC may be used in SHVC, MV-HEVC, and/or SMV-HEVC. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or SMV-HEVC codec.

An access unit in SHVC, MV-HEVC and SMV-HEVC may be defined as a set of NAL units that are associated with each other according to a specified classification rule, are consecutive in decoding order, and contain the VCL NAL units of all coded pictures associated with the same output time and their associated non-VCL NAL units.

In MV-HEVC, SMV-HEVC, and reference index based SHVC solution, the block level syntax and decoding process are not changed for supporting inter-layer texture prediction. Only the high-level syntax has been modified (compared to that of HEVC) so that reconstructed pictures (upsampled if necessary) from a reference layer of the same access unit can be used as the reference pictures for coding the current enhancement layer picture. The inter-layer reference pictures as well as the temporal reference pictures are included in the reference picture lists. The signalled reference picture index is used to indicate whether the current Prediction Unit (PU) is predicted from a temporal reference picture or an inter-layer reference picture. The use of this feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope and/or persistence of the indication(s) may be indicated along with the indication(s) themselves and/or may be inferred.

The reference list(s) in MV-HEVC, SMV-HEVC, and a reference index based SHVC solution may be initialized using a specific process in which the inter-layer reference picture(s), if any, may be included in the initial reference picture list(s). A first example of constructing reference picture list(s) is provided in the following. For example, the temporal references may be firstly added into the reference lists (L0, L1) in the same manner as the reference list construction in HEVC. After that, the inter-layer references may be added after the temporal references. The inter-layer reference pictures may be for example concluded from the layer dependency information, such as the RefLayerId[i] variable derived from the VPS extension as described above. The inter-layer reference pictures may be added to the initial reference picture list L0 if the current enhancement-layer slice is a P-Slice, and may be added to both initial reference picture lists L0 and L1 if the current enhancement-layer slice is a B-Slice. The inter-layer reference pictures may be added to the reference picture lists in a specific order, which can but need not be the same for both reference picture lists. For example, an opposite order of adding inter-layer reference pictures into the initial reference picture list 1 may be used compared to that of the initial reference picture list 0. For example, inter-layer reference pictures may be inserted into the initial reference picture 0 in an ascending order of nuh_layer_id, while an opposite order may be used to initialize the initial reference picture list 1.

A second example of constructing reference picture list(s) is provided in the following with reference to the present draft SHVC (JCTVC-N1008) and MV-HEVC (JCT3V-E1004) standards: Inter-layer reference pictures are selected and placed into the reference picture list(s) using the following steps:

1. The VPS extension (direct_dependency_flag[i][j]) is used to specify the layers which may be used for inter-layer prediction.
2. Active inter-layer reference pictures can be indicated in the slice header (inter_layer_pred_layer_idc[i]) and can be a subset of the layers indicated by the VPS extension. An inter-layer reference picture set, consisting of two subsets RefPicSetInterLayer0 and RefPicSetInterLayer1, is decoded accordingly. The inter-layer reference picture set decoding process depends on the ViewId value specified in MV-HEVC.
3. Reference picture lists are initialized to include the pictures in the inter-layer reference picture set. The pictures in RefPicSetInterLayer0 are located in a different position within the reference picture list(s) from the position of the pictures in RefPicSetInterLayer1.
4. Reference picture lists may be modified using the reference picture list modification syntax structure.

In an embodiment, which may be applied independently of or together with other embodiments, the encoder indicates in a sequence level syntax structure and the decoder decodes from a sequence level syntax structure one or more reference picture list initialization patterns, which specify at least one of the following:

Partitioning of potential inter-layer reference pictures into two or more subsets, which are positioned in the initial reference picture list(s) differently.
Positions (within one or more initial reference picture lists) of the inter-layer reference picture set partitions.
The picture order used to initialize the initial reference picture list(s) when it comes to the inter-layer reference pictures within each inter-layer reference picture set partition.
Positions (within one or more initial reference picture lists) of the (temporal) reference picture subsets.
The picture order used to initialize the initial reference picture list(s) when it comes to (temporal) reference picture subsets.

For example, an embodiment may be realized as follows:
The encoder may specify in the VPS extension and/or the decoder may decoder from the VPS extension zero or more partitionings of active inter-layer reference pictures. Each partitioning is assigned an index.
inter-layer reference picture partitioning specifies the division of active inter-layer reference pictures into two subsets (0 and 1, which correspond to RefPicSetInterLayer0 and RefPicSetInterLayer1, respectively).
The encoder may include a gating flag, il_rps_partition_enabled_flag, in the PPS and/or the decoder may decode the gating flag from the PPS. The gating flag controls the presence of the il_rps_partition_idx syntax element in the slice segment header.
When there are more than one active inter-layer reference picture and when il_rps_partition_enabled_flag is equal to 1, the slice header includes an index of the inter-layer reference picture set partitioning, il_rps_partition_idx, to be used (when the number of partitionings is greater than 1) or il_rps_partition_idx is inferred to be equal to 0 (when the number of partitionings is equal to 1).

In video coding standards, a compliant bit stream must be able to be decoded by a hypothetical reference decoder that may be conceptually connected to the output of an encoder and consists of at least a pre-decoder buffer, a decoder and an output/display unit. This virtual decoder is known as the hypothetical reference decoder (HRD) in e.g. H.263, H.264 and H.265/HEVC, and the video buffering verifier (VBV) e.g. in MPEG-4 Part 2. The virtual decoder and buffering verifier are collectively called as hypothetical reference decoder (HRD) in this document.

Video coding standards use variable-bitrate coding, which is caused for example by the flexibility of the encoder to select adaptively between intra and inter coding techniques for compressing video frames. To handle fluctuation in the bitrate variation of the compressed video, buffering may be used at the encoder and decoder side. Hypothetical Reference Decoder (HRD) may be regarded as a hypothetical decoder model that specifies constraints on the variability within conforming bitstreams, conforming NAL unit streams or conforming byte streams that an encoding process may produce.

A bitstream is compliant if it can be decoded by the HRD without buffer overflow or, in some cases, underflow. Buffer overflow happens if more bits are to be placed into the buffer when it is full. Buffer underflow happens if some bits are not in the buffer when said bits are to be fetched from the buffer for decoding/playback.

An HRD may be a part of an encoder or operationally connected to the output of the encoder. The buffering occupancy and possibly other information of the HRD may be used to control the encoding process. For example, if a coded data buffer in the HRD is about to overflow, the encoding bitrate may be reduced for example by increasing a quantizer step size.

The operation of the HRD may be controlled by HRD parameters, such as buffer size(s) and initial delay(s). The HRD parameter values may be created as part of the HRD process included or operationally connected to encoding. Alternatively, HRD parameters may be generated separately from encoding, for example in an HRD verifier that processes the input bitstream with the specified HRD process and generates such HRD parameter values according to which the bitstream in conforming. Another use for an HRD verifier is to verify that a given bitstream and given HRD parameters actually result into a conforming HRD operation and output.

HRD conformance checking may concern for example the following two types of bitstreams: The first such type of bitstream, called Type I bitstream, is a NAL unit stream containing only the VCL NAL units and filler data NAL units for all access units in the bitstream. The second type of bitstream, called a Type II bitstream, may contain, in addition to the VCL NAL units and filler data NAL units for all access units in the bitstream, additional non-VCL NAL units other than filler data NAL units and/or syntax elements such as leading_zero_8 bits, zero_byte, start_code_prefix_one_3 bytes, and trailing_zero_8 bits that form a byte stream from the NAL unit stream.

Two types of HRD parameters (NAL HRD parameters and VCL HRD parameters) may be used. The HRD parameters may be indicated through video usability information included in the sequence parameter set syntax structure. The HRD parameters may, for example, include buffer size and input bitrate.

Buffering and picture timing parameters (e.g. included in sequence parameter sets and picture parameter sets referred to in the VCL NAL units and in buffering period and picture timing SEI messages) may be conveyed to the HRD, in a timely manner, either in the bitstream (by non-VCL NAL units), or by out-of-band means externally from the bitstream e.g. using a signalling mechanism, such as media parameters included in the media line of a session description formatted e.g. according to the Session Description Protocol (SDP). For the purpose of counting bits in the HRD, only the appropriate bits that are actually present in the bitstream may be counted. When the content of a non-VCL NAL unit is conveyed for the application by some means other than presence within the bitstream, the representation of the content of the non-VCL NAL unit may or may not use the same syntax as would be used if the non-VCL NAL unit were in the bitstream.

Figure 10:
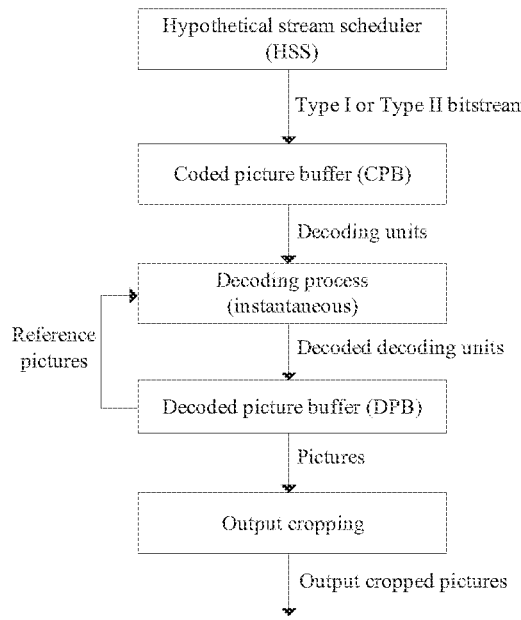
FIG. 10 shows a schematic diagram of a buffering model according to prior art.

The HRD may contain a coded picture buffer (CPB), an instantaneous decoding process, a decoded picture buffer (DPB), and output cropping, as illustrated in FIG. 10.

The CPB may operate on decoding unit basis. A decoding unit may be an access unit or it may be a subset of an access unit, such as an integer number of NAL units. The selection of the decoding unit may be indicated by an encoder in the bitstream. For example, decoding unit SEI messages may indicate decoding units as follows: The set of NAL units associated with a decoding unit information SEI message consists, in decoding order, of the SEI NAL unit containing the decoding unit information SEI message and all subsequent NAL units in the access unit up to but not including any subsequent SEI NAL unit containing a decoding unit information SEI message. Each decoding unit may be required to include at least one VCL NAL unit. All non-VCL NAL units associated with a VCL NAL unit may be included in the decoding unit containing the VCL NAL unit.

Encoders may determine that decoding units are for example tiles or CTU rows (when encoding constraints enabling wavefront processing have been applied). When a decoding unit is a subset of picture, a lower latency in the encoding and decoding may be achieved. HEVC enables indicate timing information for DUs. For example, the removal time of a DU is further derived from the removal time of the AU that contains the DU and corresponding set of du_cpb_removal_delay_increment_minus1 in the picture timing SEI message (PTSEI) of the AU or the Decoding Unit Information SEI message (DISEI). The nominal removal time of the last DU in an AU and that of the AU is aligned. Instead of using du_cpb_removal_delay_increment_minus1, the removal time of a DU can be also derived from du_common_cpb_removal_delay_increment_minus1 in the PTSEI of the AU, or from du_spt_cpb_removal_delay_increment in the Decoding Unit Information SEI (DISEI) message which is associated with each DU. The former method is applied when du_cpb_removal_delay_incrememt_minus1 of all DUs are identical. The latter method is applied when an encoder decides the removal time of a DU after encoding the DU. It is noted that when DISEI is not used, an encoder has to decide the removal times of all DUs in an AU before encoding the DUs since the buffering period SEI message (BPSEI) and the PTSEI are required to always be transmitted before the DUs and the encoding of the BPSEI and the PTSEI after encoding the DUs introduces one picture delay. A further point to note is that using the DISEI allows for generating timing information after a DU is encoded. In a typical ultra-low delay system, the bits of the preceding DU are already on the wire, i.e. they are already transmitted or still being transmitted. The case not using DISEIs implies that an encoder might occasionally generate a bitstream in which an underflow of the CPB at a DU occurs (i.e. the last bit of the DU is not delivered to the CPB before its CPB removal time). This situation may be improved by using the low_delay_hrd_flag in VUI similarly as in H.264/AVC. In order to maintain the additional delay caused by underflow equally both in AU and DU based HRD operation, it may be required that an encoder generates an AU which causes overflow at AU level when a DU inside the AU causes overflow.

It has been proposed e.g. in document JCTVC-NO290 that an ultra-low-delay (ULD) operation for a scalable bitstream may be achieved by interleaving DUs of different layers in the bitstream. This enables the encoder to encode pictures of different layers parallelly and output tiles, CTU rows (when encoding constraints enabling wavefront processing have been applied) and/or slices from different layers in an interleaved manner. It is noted that the coded data, such as NAL units, of one picture appear in decoding order in the bitstream, but may be interleaved by coded data of other pictures. The decoder may operate in a parallel fashion such a way that decoding units of different layers may be decoded by different processing units. However, if a decoder wishes to operate sequentially and decode one picture at a time in layer dependency order, it needs to buffer coded data and collect all NAL units that form a coded picture from the interleaved bitstream. It may be indicated in the bitstream, for example with a flag in a sequence-level syntax structure such as VPS, whether or not an interleaved NAL unit is or may be in use in the bitstream.

The HRD may operate for example as follows. Data associated with decoding units that flow into the CPB according to a specified arrival schedule may be delivered by the Hypothetical Stream Scheduler (HSS). The arrival schedule may be determined by the encoder and indicated for example through picture timing SEI messages, and/or the arrival schedule may be derived for example based on a bitrate which may be indicated for example as part of HRD parameters in video usability information. The HRD parameters in video usability information may contain many sets of parameters, each for different bitrate or delivery schedule. The data associated with each decoding unit may be removed and decoded instantaneously by the instantaneous decoding process at CPB removal times. A CPB removal time may be determined for example using an initial CPB buffering delay, which may be determined by the encoder and indicated for example through a buffering period SEI message, and differential removal delays indicated for each picture for example though picture timing SEI messages. The initial arrival time (i.e. the arrival time of the first bit) of the very first decoding unit may be determined to be 0. The initial arrival time of any subsequent decoding unit may be determined to be equal to the final arrival time of the previous decoding unit. Each decoded picture is placed in the DPB. A decoded picture may be removed from the DPB at the later of the DPB output time or the time that it becomes no longer needed for inter-prediction reference. Thus, the operation of the CPB of the HRD may comprise timing of decoding unit initial arrival (when the first bit of the decoding unit enters the CPB), timing of decoding unit removal and decoding of decoding unit, whereas the operation of the DPB of the HRD may comprise removal of pictures from the DPB, picture output, and decoded picture marking and storage.

The operation of an AU-based coded picture buffering in the HRD can be described in a simplified manner as follows. It is assumed that bits arrive into the CPB at a constant arrival bitrate (when the so-called low-delay mode is not in use). Hence, coded pictures or access units are associated with initial arrival time, which indicates when the first bit of the coded picture or access unit enters the CPB. Furthermore, in the low-delay mode the coded pictures or access units are assumed to be removed instantaneously when the last bit of the coded picture or access unit is inserted into CPB and the respective decoded picture is inserted then to the DPB, thus simulating instantaneous decoding. This time is referred to as the removal time of the coded picture or access unit. The removal time of the first coded picture of the coded video sequence is typically controlled, for example by the Buffering Period Supplemental Enhancement Information (SEI) message. This so-called initial coded picture removal delay ensures that any variations of the coded bitrate, with respect to the constant bitrate used to fill in the CPB, do not cause starvation or overflow of the CPB. It is to be understood that the operation of the CPB is somewhat more sophisticated than what described here, having for example the low-delay operation mode and the capability to operate at many different constant bitrates. Moreover, the operation of the CPB may be specified differently in different standards.

When the bitstream starts at an IRAP picture, for example as a result of accessing a file or stream randomly and starting the decoding from an IRAP picture or tuning into a broadcast, there can be leading pictures (RADL and/or RASL pictures) that follow the IRAP picture in decoding order and precede it in output order. It is possible to discard or omit the decoding of these leading pictures following the RAP picture without affecting the decoding operation, as these leading pictures have no effect on the decoding process of any other pictures.

The buffering period SEI message of HEVC supports indicating two sets of initial buffering delay and initial buffering delay offset parameters, which can be signaled for example at an IRAP picture. One set of values specifies the required initial buffering when the leading pictures associated with the IRAP picture (with which the buffering period SEI message is associated) are present in the bitstream. The other set of values specifies the required initial buffering when leading pictures are not present in the bitstream or are discarded prior to scheduling them with HSS and/or inputting them into the CPB. The HRD operation may be required to be verified with the HRD for both sets of buffering parameters provided in the buffering period SEI message.

The DPB is used, among other things, to control the required memory resources for decoding of conforming bitstreams. There are two reasons to buffer decoded pictures, for references in prediction and for reordering decoded pictures into output order. As H.264/AVC and HEVC provide a great deal of flexibility for both reference picture marking and output reordering, separate buffers for reference picture buffering and output picture buffering could have been a waste of memory resources. Hence, the DPB includes a unified decoded picture buffering process for reference pictures and output reordering. A decoded picture may be removed from the DPB when it is no longer used as reference and needed for output.

When the bitstream starts at an IRAP picture, for example as a result of accessing a file or stream randomly and starting the decoding from an IRAP picture or tuning into a broadcast, there can be leading pictures (RADL and/or RASL pictures) that follow the IRAP picture in decoding order and precede it in output order. It is possible to discard or omit the decoding of these leading pictures following the RAP picture without affecting the decoding operation, as these leading pictures have no effect on the decoding process of any other pictures.

The buffering period SEI message of HEVC supports indicating two sets of initial buffering delay and initial buffering delay offset parameters, which can be signaled for example at an IRAP picture. One set of values specifies the required initial buffering when the leading pictures associated with the IRAP picture (with which the buffering period SEI message is associated) are present in the bitstream. The other set of values specifies the required initial buffering when leading pictures are not present in the bitstream or are discarded prior to scheduling them with HSS and/or inputting them into the CPB. The HRD operation may be required to be verified with the HRD for both sets of buffering parameters provided in the buffering period SEI message.

The HRD may be used to check conformance of bitstreams and decoders.

Bitstream conformance requirements of the HRD may comprise for example the following and/or alike. The CPB is required not to overflow (relative to the size which may be indicated for example within HRD parameters of video usability information) or underflow (i.e. the removal time of a decoding unit cannot be smaller than the arrival time of the last bit of that decoding unit). The number of pictures in the DPB may be required to be smaller than or equal to a certain maximum number, which may be indicated for example in the sequence parameter set. All pictures used as prediction references may be required to be present in the DPB. It may be required that the interval for outputting consecutive pictures from the DPB is not smaller than a certain minimum.

Decoder conformance requirements of the HRD may comprise for example the following and/or alike. A decoder claiming conformance to a specific profile and level may be required to decode successfully all conforming bitstreams specified for decoder conformance provided that all sequence parameter sets and picture parameter sets referred to in the VCL NAL units, and appropriate buffering period and picture timing SEI messages are conveyed to the decoder, in a timely manner, either in the bitstream (by non-VCL NAL units), or by external means. There may be two types of conformance that can be claimed by a decoder: output timing conformance and output order conformance.

To check conformance of a decoder, test bitstreams conforming to the claimed profile and level may be delivered by a hypothetical stream scheduler (HSS) both to the HRD and to the decoder under test (DUT). All pictures output by the HRD may also be required to be output by the DUT and, for each picture output by the HRD, the values of all samples that are output by the DUT for the corresponding picture may also be required to be equal to the values of the samples output by the HRD.

For output timing decoder conformance, the HSS may operate e.g. with delivery schedules selected from those indicated in the HRD parameters of video usability information, or with "interpolated" delivery schedules. The same delivery schedule may be used for both the HRD and DUT. For output timing decoder conformance, the timing (relative to the delivery time of the first bit) of picture output may be required to be the same for both HRD and the DUT up to a fixed delay.

For output order decoder conformance, the HSS may deliver the bitstream to the DUT "by demand" from the DUT, meaning that the HSS delivers bits (in decoding order) only when the DUT requires more bits to proceed with its processing. The HSS may deliver the bitstream to the HRD by one of the schedules specified in the bitstream such that the bit rate and CPB size are restricted. The order of pictures output may be required to be the same for both HRD and the DUT.

In HEVC, there are two modes according to which the HRD may operate, i.e. either at access unit level or a sub-picture level based on decoding units. In the sub-picture mode, the data associated with each decoding unit are removed and decoded instantaneously by the instantaneous decoding process at CPB removal time of the decoding unit. In the access unit level mode, all data associated with an access unit is removed and decoded instantaneously by the instantaneous decoding process at CPB removal time of the access unit.

HRD models typically include instantaneous decoding, while the input bitrate to the coded picture buffer (CPB) of HRD may be regarded as a constraint for the encoder and the bitstream on decoding rate of coded data and a requirement for decoders for the processing rate. The CPB operates in a serial fashion, i.e. decodes data units, such as coded pictures or H.265/HEVC decoding units, in their decoding or bitstream order. Consequently, the HRD models do not support parallel processing, where more than one processing unit, such as a processor or a core in a multi-core processor, decodes data. Therefore, timing and/or bitrate information are only provided for serial processing considerations.

This has at least the following consequences:
1. One of the motivations for the HRD is to avoid so-called evil bitstreams, which would consume such a large quantity of resources that practical decoder implementations would not be able to handle. The lack of parallel processing considerations in the HRD make it impossible to ensure that a single processing unit would not be loaded with an evil bitstream portion consuming too large a quantity of resources.
2. The lack of parallel processing considerations in the HRD also cause that no timing and delay information for parallel decoding can be indicated. Consequently, timing and delays are indicated for serial processing and no ultra-low-delay operation taking advantage of multiple processing units is supported by the HRD.
3. HRD buffer sizes and timing information is used in many decoder implementations. The lack of parallel processing considerations in the HRD make it harder or impossible to use signalled HRD buffer sizes and timing information in decoder implementations using multiple processing units.

Especially in the context of the ongoing MV-HEVC/SHVC standardization, at least some of the following issues should be addressed:
1. How to add or remove layers at re-distribution points with straightforward implications on HRD parameters and their signalling
2. How to provide support for ultra-low delay with layered scalability
3. How to ensure hybrid codec scalability, where the base layer is not HEVC-coded
4. How to provide inherent support for multi-core processing. In both ultra-low delay for scalable bitstreams (JCTVC-N0290) and in hybrid codec scalability, there is an assumption that there are at least independent processing cores decoding the bitstream.
5. How to provide inherent support for systems where layers are transmitted using separate logical channels without a need to re-multiplex layers into one bitstream.

Now in order to at least alleviate the above problems, an improved method for operating coded picture buffers (CPB) is presented hereinafter.

A term data unit is referred to in the description below, which is a unit based on which the coded picture buffering operates. For example an initial arrival time into the CPB and a removal time from the CPB may be determined and indicated on data unit basis. A data unit may for example be a decoding unit of HEVC, while other options are described further below.

Figure 7:
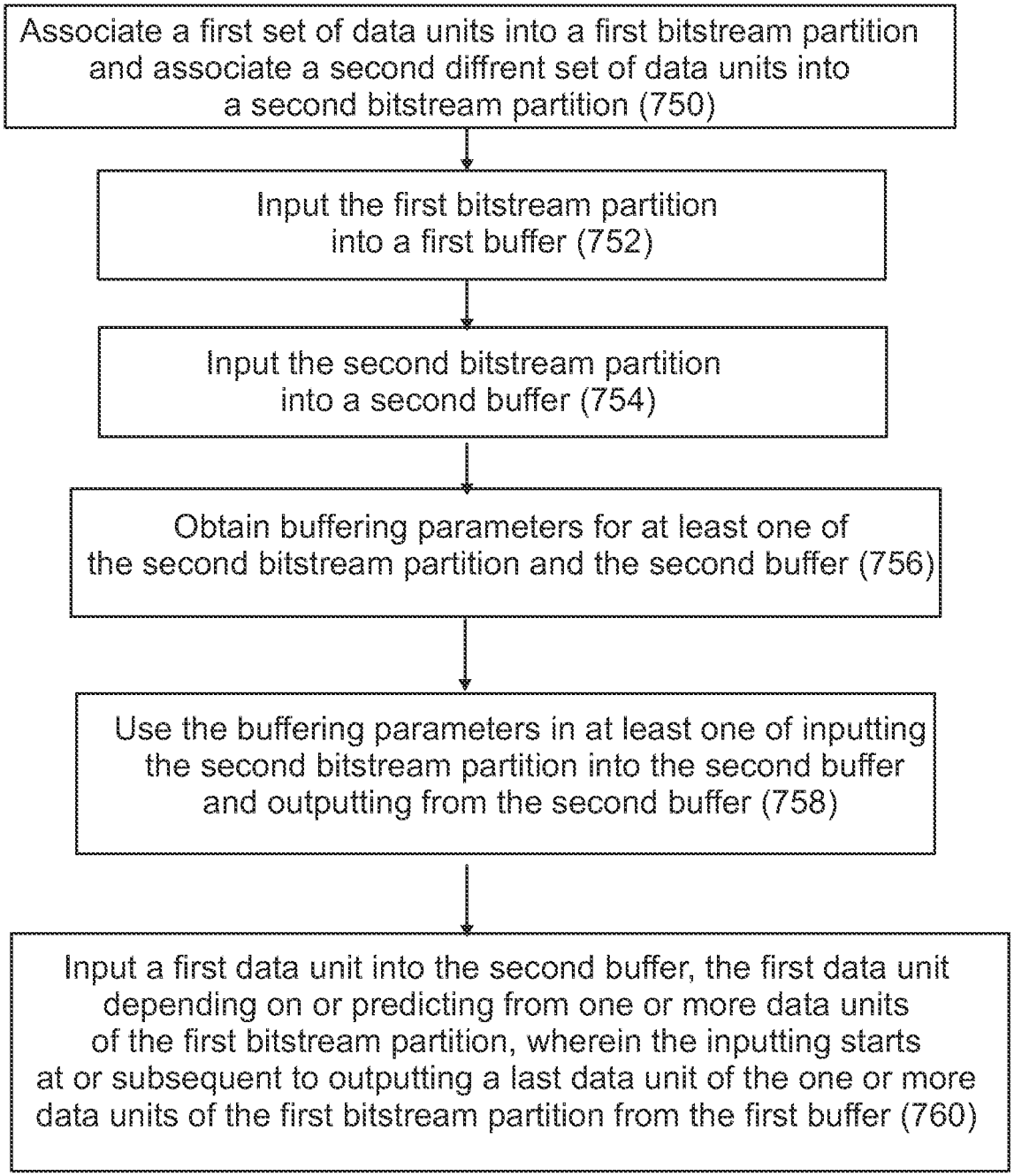
FIG. 7 shows a flow chart of a bitstream partitioning process according to an embodiment of the invention.

In the method, which is disclosed in FIG. 7, a first set of data units is associated (750) into a first bitstream partition and a second set of data units is associated (752) into a second bitstream partition, where the first set comprises data units different from those of the second set. The first bitstream partition is input (754) into a first buffer, and the second bitstream partition is input (756) into a second buffer. Next, buffering parameters for at least one of the second bitstream partition and the second buffer are obtained (758) to be used in at least one of inputting the second bitstream partition into the second buffer and outputting from the second buffer. Then, according to an embodiment, a first data unit may be input (760) into the second buffer, the first data unit depending on or predicting from one or more data units of the first bitstream partition, wherein the inputting starts at or subsequent to outputting a last data unit of the one or more data units of the first bitstream partition from the first buffer.

In other words, more than one coded picture buffer, referred to as bitstream partition buffer (BPB0, BPB1, . . . ), is maintained. The bitstream can be partitioned into one or more bitstream partitions. The decoding of bitstream partition 0 (a.k.a. the base bitstream partition) is independent of other bitstream partitions. For example, the base layer (and the NAL units associated with the base layer) may be the base bitstream partition, while bitstream partition 1 may consist of the remaining bitstream excluding the base bitstream partition. In the CPB operation as described herein, the decoding unit (DU) processing periods (from the CPB initial arrival until the CPB removal) can be overlapping in different BPBs. Hence, the HRD model inherently supports parallel processing with an assumption that the decoding process for each bitstream partition is able to decode in real-time the incoming bitstream partition with its scheduled rate.

According to an embodiment, the first bitstream partition uses a first coding format and the second bitstream partition uses a second coding format.

According to an embodiment, the first bitstream partition conforms to the Advanced Video Coding standard and the second bitstream partition conforms to an extension of the High Efficiency Video Coding standard, such as SHVC or MV-HEVC.

Thus, the embodiments provide support for hybrid codec scalability, where the base layer is not HEVC-coded. The base bitstream partition may be considered to consist of the non-HEVC-coded base layer. If the non-HEVC-coded base layer resides in a different bitstream than the HEVC-coded enhancement layers, the CPB of the non-HEVC-coded base layer bitstream may operate according to the specification where it is specified. For example, if the base bitstream partition conforms to H.264/AVC, the CPB operation specified in the H.264/AVC standard may be used for the base bitstream partition as if the base bitstream partition were a conventional H.264/AVC bitstream. The remaining of the bitstream may be handled with bitstream-partition-specific CPB operation.

According to an embodiment, the data units comprise subsets of coded pictures. The data units may be, for example, HEVC decoding units (DU). Thus, instead of conventional (picture-based) HRD operation, a DU-based approach enables ultra-low delay operation with layered scalability. The DU processing periods (from the CPB initial arrival until the CPB removal) can be overlapping in different BPBs. Hence, the HRD model inherently supports parallel processing with an assumption that the decoding process for each bitstream partition is able to decode in real-time the incoming bitstream partition with its scheduled rate.

According to an embodiment, the data units comprise one or more Network Abstraction Layer (NAL) units.

According to an embodiment, a data unit comprises the VCL NAL units of one coded picture and the associated non-VCL NAL units. According to an embodiment, a data unit comprises the VCL NAL units of an integer number of coded pictures, which may reside in particular layers, and the associated non-VCL NAL units.

According to an embodiment, a bitstream partition comprises single layer. Consequently data units of a bitstream partition may, for example, be tiles or tile sets of a picture of the layer within the bitstream partition. In another example, data units may be CTU rows or sets of CTU rows of a picture, where wavefront parallel processing may have been enabled in the encoding of the picture. In some embodiments a tile, a tile set, a CTU row or a set of CTU rows that is considered a data unit may comprise a dependent slice segment and/or may be prefixed by a start-code and/or may be pointed to by an entry point. In a third example, data units may be slices of a picture.

According to an embodiment, a bitstream partition may comprise more than one layers and data units may for example comprise a part of a picture or many pictures, such as all pictures of the layers belonging to the bitstream partition and residing within one access unit.

According to an embodiment, inputting the second bitstream partition into the second buffer comprises delaying the inputting of the first data unit into the second buffer until the final arrival, removal, and/or output of the last data unit of the one or more data units of the first bitstream partition from the first buffer. For example, the inputting of the first data unit into the second buffer may be delayed such that its removal time is smaller than or equal to the removal time of the last data unit of the one or more data units of the first bitstream partition from the first buffer.

Herein, according to some embodiments, the bitstream-partition-specific CPB operation makes sure that the processing of a base layer picture has been completed in the CPB before starting the processing of any enhancement layer picture depending on it. This may be implemented, for example, by introducing a new flag (cbr_flag) for taking into account prediction dependencies between DUs of different layers. When the cbr_flag is equal to 1, a non-zero initial arrival time for DU 0 is defined for BPB 1 (and higher) and it is a requirement for bitstream conformance (and particularly to the initial arrival delay) that the initial arrival time of a DU into BPB 1 shall not start earlier than the final arrival time of any DU or picture it predicts from. More details of the implementation of the cbr_flag are provided further below.

According to an embodiment, obtaining the buffering parameters further comprises obtaining an initial arrival delay; and starting the inputting the second bitstream partition into the second buffer when the initial arrival delay has elapsed. Herein, when the cbr_flag is equal to 0, the initial arrival time of a DU into BPB 1 is limited not to start earlier than the final arrival time of any DU or picture it predicts from.

According to an embodiment, the encoder or another entity, such as an HRD verifier, indicates an initial arrival delay of a bitstream partition in the bitstream, for example in a bitstream partition initial arrival time SEI message or as part of a buffering period SEI message intended for a bitstream partition. The initial arrival delay of a bitstream partition may for example be indicated for a random access point. According to an embodiment, the decoder or HRD decodes an initial arrival delay of a bitstream partition from the bitstream and uses it in buffering of the bitstream partition.

According to an embodiment, the encoder or another entity, such as an HRD verifier, indicates a unit of synchronizing BPBs and/or considering dependencies between data units of BPBs. For example, a VPS VUI flag, du_based_b-pb_sync_flag, may be used to indicate whether the final arrival time of pictures or DUs are considered above. A final arrival time of pictures suits conventional (picture-based) HRD operation, while a final arrival time of DUs suits ultra-low delay operation with layered scalability.

According to an embodiment, an encoder or another entity, such as an HRD verifier, indicates in a sequence-level syntax structure, such as VPS, whether the bitstream contains buffering parameters for bitstream-partition-specific CPB operation described in various embodiments. For example, the VUI part of VPS may contain a syntax element indicating the number of bitstream partitions for which HRD parameters are provided. If the number of bitstream partitions is indicated to be 1, meaning that the entire bitstream forms the only partition, it may be concluded that the parameters for the bitstream-partition-specific CPB operation are not provided in the bitstream.

According to an embodiment, the same bitstream may be partitioned to bitstream partitions in one more than one way and HRD parameters for more one partitioning may be provided. An encoder or another entity, such as an HRD verifier, may indicate in a sequence-level syntax structure, such as VPS, the number of partitionings for the bitstream. A first partitioning may for example comprise a first bitstream partition comprising the base layer and a second partition comprising two enhancement layers, while a second partitioning may for example comprise a first bitstream partition comprising the base layer and the first enhancement layer and a second partition comprising the second enhancement layer.

According to an embodiment, the encoder or another entity, such as an HRD verifier, may include bitstream-partition-specific HRD parameters in a sequence-level structure, such as VPS. In other words, the HRD parameters may be indicated per a bitstream partition in the sequence-level structure. Said HRD parameters may comprise but are not limited to one or more of the following:

an indication whether NAL HRD parameters (for Type II bitstream conformance) are present;

an indication whether VCL HRD parameters are present;

various elementary units for HRD operation, such as indication of a clock tick unit and other indications included in the hrd_parameters( ) syntax structure of HEVC.

Additionally the sequence-level syntax structure may include a number of schedules or CPB specifications and for each schedule, the CPB size and bitrate used in the input to the CPB. The sequence-level syntax structure may indicate for a bitstream partitioning and each bitstream partition of the partition which CPB size and bitrate is used for the bitstream partition.

According to an embodiment, the method comprises decoding indications related to the number of partitionings and/or the number of partitions from a sequence-level syntax structure. The method may further comprise decoding HRD parameters from a sequence-level structure indicating characteristics of buffering in bitstream-partition-specific CPB operation, such as buffer size and input bitrate. The decoder may then select if bitstream-partition-based operation suits its computing and other resources and select which partitioning suits its resources or operating environment. The decoder may also select which schedule suits its resources or operating environment. The decoder may further allocate processing units to bitstream partitions and/or allocate and initialize buffers to bitstream buffers according to the decoded information.

Two bitstream partitionings may also be identical otherwise but differ in terms of the data unit used. For example, in a first partitioning a picture may be used as a data unit and in a second partitioning a decoding unit may be used as a data unit.

According to an embodiment, the method further comprises obtaining information which data structures, coding layers, and/or scalability layers form data units. For example, the method may comprise obtaining information whether each data unit is a NAL unit, a decoding unit specified as in HEVC or similarly, a coded picture, or all coded pictures of one access unit belonging to the bitstream partition.

According to an embodiment, the method further comprises encoding an indication capable of indicating which data structure, coding layers, and/or scalability layers form data units, the indication for example being capable of indicating a picture or a decoding unit. The indication may for example reside in a sequence-level structure such as VPS. The indication may be specific for each indicated bitstream partitioning. In some embodiments, the indication may indicate more than one basis of forming data units, such as both a picture and a decoding unit. It may be required that when an indication indicates a certain basis for data units, the timing and other information is available in the bitstream on that basis. For example, if the indication indicates that decoding units forms a data unit, it may be required that the bitstream contains timing information for decoding units.

According to an embodiment, the method further comprises decoding an indication related to data units, the indication being capable of indicating for example a picture or a decoding unit. The decoder may select between bitstream partitionings having a different basis for data units, such as select between data units being pictures or decoding units. Likewise, the decoder may select its operation mode based on which data structure, coding layers, and/or scalability layers form a data unit. For example, when data units are formed by decoding units, a low-delay operation may be selected in the decoder, while when data units are formed by pictures, a picture-based operation may be selected in the decoder. If the bitstream contains bitstream partitionings and related parameters for more than one basis of data units, such as both for decoding units and for pictures, the decoder may select which bitstream partitioning and/or basis of data units it applies for example based on its application environment. For example, a decoder operating within a display device in a proximity screen sharing application may determine to use decoding unit based operation.

According to an embodiment, when implemented in an encoder or another entity, such as an HRD verifier, the method may further comprise encoding the buffering parameters. The buffering parameters may comprise e.g. buffering period for bitstream partitions and timing information for data units within bitstream partitions.

According to an embodiment, encoding the buffering parameters comprises encoding a nesting data structure indicating a bitstream partition and encoding the buffering parameters within the nesting data structure. The buffering period and picture timing information for bitstream partitions may, for example, be conveyed using the buffering period, picture timing and decoding unit information SEI messages included in nesting SEI messages. In an embodiment, a scalable nesting SEI message of HEVC or a similar scalable nesting SEI message may be used in which the contained SEI messages are indicated to apply to particular layers that form a bitstream partition. In a scalable nesting SEI message of HEVC, the encoder or another entity, such as an HRD verifier, may set the bitstream_subset_flag equal to 0 to indicate that the contained SEI messages apply to specific layers, which are also indicated in the scalable nesting SEI message. In an embodiment, a specific bitstream partition nesting SEI message is specified. The syntax of the bitstream partition nesting SEI message includes one or more indications which bitstream partitioning and/or which bitstream partition (within the indicated bitstream partitioning) it applies to. The indications may for example be indices that refer to the syntax-level syntax structure where the bitstream partitionings and/or bitstream partitions are specified and where either a partitioning and/or partition is implicitly indexed according to the order it is specified or explicitly indexed with a syntax element, for example.

In an embodiment, buffering period and picture timing information for bitstream partitions are conveyed using SEI messages or other data structures that are specific to the bitstream-partition-specific CPB operation. For example, BPB buffering period SEI message may be specified to indicate initial buffering properties for a BPB and/or a BPB timing SEI message may be specified to indicate timing of a data unit within a BPB.

According to an embodiment, the method further comprises encoding the first bitstream partition; encoding the second bitstream partition; and adapting at least one the first bitstream partition and the second bitstream partition in their encoding in order to conform to the buffering parameters. It may, for example, be specified that when these SEI messages are contained in the scalable nesting SEI message with bitstream_subset_flag equal to 0, they apply to bitstream partitions consisting of the layers indicated by the scalable nesting SEI message.

The encoded buffering parameters may be sent to the decoder along a bitstream or by other means, such as using a signaling protocol. Thus, according to an embodiment, obtaining the buffering parameters comprises decoding the buffering parameters.

The decoding process may then be controlled according to the decoded buffering parameters. The decoder may operate its buffers similarly to the bitstream-partition-specific CPB operation of the HRD model. According to an embodiment, the method further comprises decoding the first bitstream partition; and decoding the second bitstream partition.

According to an embodiment, the method is used as part of hypothetical decoding.

A bitstream demultiplexer may be used to partition the bitstream into bitstream partitions. However, the bitstream partitions may also be considered to be directly provided by the systems layer. According to an embodiment, the method further comprises receiving a bitstream; forming the first bitstream partition by selecting data units from the bitstream; and forming the second bitstream partition by selecting data units from the bitstream.

In an embodiment, a decoding order of decoding units across layers is inferred or indicated for a bitstream partitioning. If an interleaved bitstream order as described above is used, the decoding order may be inferred to be the same as the bitstream order of decoding units. If an interleaved bitstream order is not used or if bitstream partitions are provided directly by the systems layer, a decoding order may be indicated by the encoder or another entity, such as an HRD verifier, a file creator, or a transmitter. The indications for the decoding order may be included in a container file or may be conveyed through the transmission mechanisms, such as within packet or payload header structures or as part of packet payloads. For example, the decoding order number (DON) signalling similar to that in H.264/AVC RTP payload format (IETF RFC 6184) or the cross-layer DON (CL-DON) signalling similar to that in the SVC RTP payload (IETF RFC 6190) may be used. The specified decoding order may be used to determine that earlier decoding units in decoding order are required to be decoded or processed by the BPB before decoding or processing a particular decoding unit. The initial arrival time of a particular decoding unit may in some embodiment not precede the final arrival time of any earlier decoding unit in said decoding order.

The method presented with various embodiments may be applied together with different types of DPB operation or DPB specifications, such as layer-specific DPB or sub-DPB where pictures with the same properties from multiple layers share the same sub-DPB. It is possible to specify a layer-specific DPB operation as a special case of the sub-DPB operation, i.e. each layer has its own sub-DPB. In a resolution-specific DPB mode, all layers that have the same spatial resolution, bit depth, and color format share the same sub-DPB.

The method can be implemented in multiple ways. For example, it is apparent that the described processing steps may be performed in different order. For example, the order of inputting bitstream partitions in their respective buffers may vary.

Figure 8:
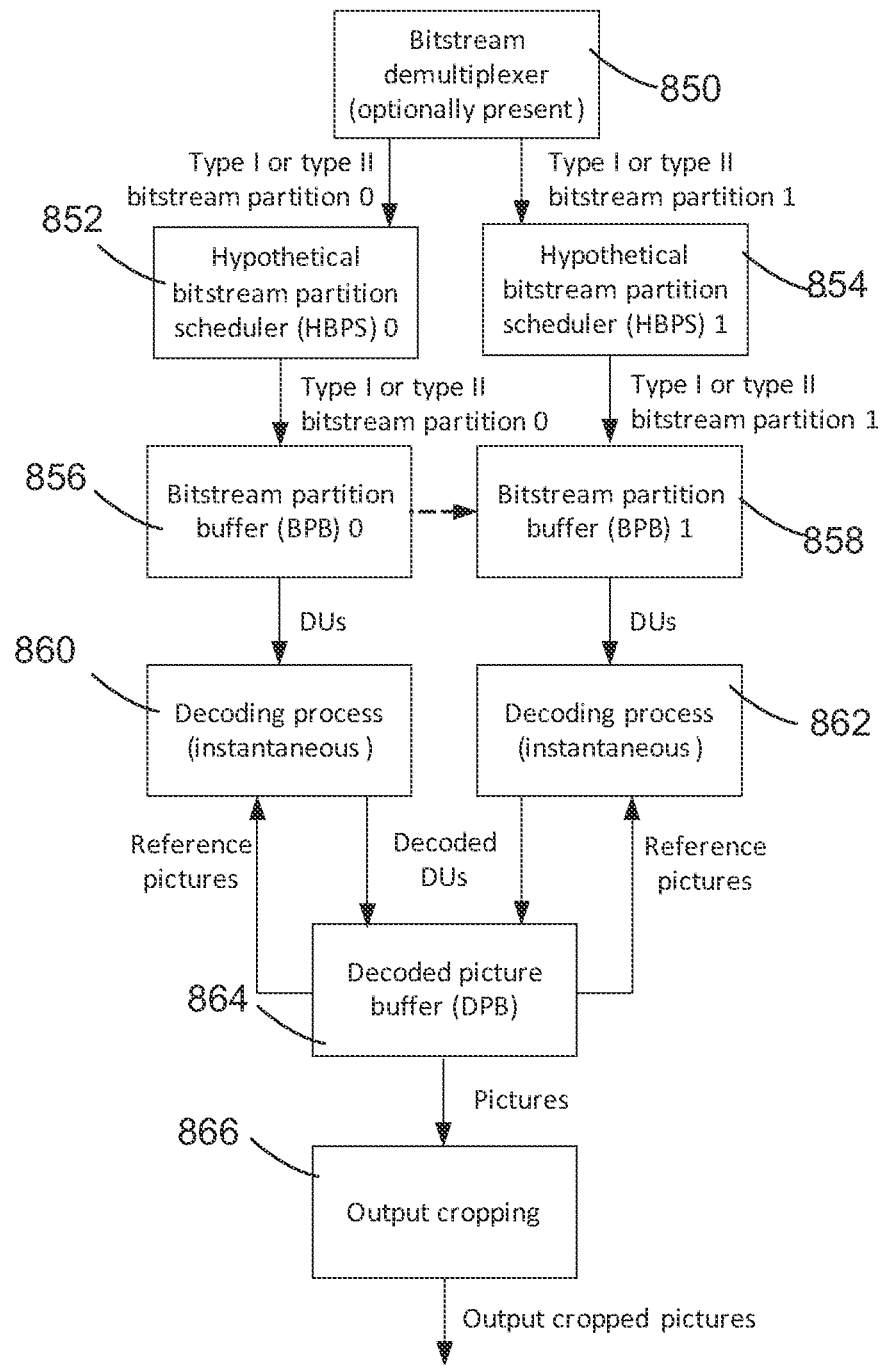
FIG. 8 shows a schematic diagram of a buffering model according to an embodiment of the invention.

FIG. 8 shows a block chart of a buffering model according to an embodiment, which may be implemented, for example, in a decoding apparatus. As described above, a bitstream demultiplexer (850) may optionally be used to partition the bitstream into bitstream partitions. Nevertheless, the bitstream partitions may also be directly provided by the systems layer, whereby the bitstream demultiplexer is not needed.

The apparatus further comprises at least a first hypothetical bitstream partition scheduler (852, HBPS0) and a second hypothetical bitstream partition scheduler (854, HBPS1). The schedulers control the timing of inputting the first and the second bitstream partitions into their respective buffers, for example, according to the buffering period and picture timing information. The respective buffers comprise at least a first bitstream partition buffer (806, BPB0) and a second bitstream partition buffer (858, BPB1).

The decoding units (DU) from the first bitstream partition buffer (856) are fed to a first instantaneous decoding process (860), where the first instantaneous decoding process typically utilizes reference pictures from a decoded picture buffer (DPB, 864) as a reference in the decoding. The decoded DUs are input to the decoded picture buffer (DPB, 864) to be possible used further as a reference in the decoding. In a similar manner, the decoding units (DU) from the second bitstream partition buffer (858) are fed to a second instantaneous decoding process (862), where the second instantaneous decoding process typically utilizes reference pictures from a decoded picture buffer (DPB, 864) as a reference in the decoding. The decoded DUs are input to the decoded picture buffer (DPB, 864).

The decoded picture buffer (DPB, 864) parses the decoded pictures from the decoded DUs and inputs the pictures in an output cropping unit (866), which outputs the cropped pictures.

A more detailed description of the Hypothetical Reference Decoder (HRD) and its use to check bitstream and decoder conformance in H.265/HEVC or MV-HEVC/SHVC is given here below.

Two types of bitstreams or bitstream subsets are subject to HRD conformance checking. The first type, called a Type I bitstream, is a NAL unit stream containing only the VCL NAL units and NAL units with nal_unit_type equal to FD_NUT (filler data NAL units) for all access units in the bitstream. The second type, called a Type II bitstream, contains, in addition to the VCL NAL units and filler data NAL units for all access units in the bitstream, at least one of the following:
- additional non-VCL NAL units other than filler data NAL units,
- all leading_zero_8 bits, zero_byte, start_code_prefix_one_3 bytes, and trailing_zero_8 bits syntax elements that form a byte stream from the NAL unit stream.

Figure 9:
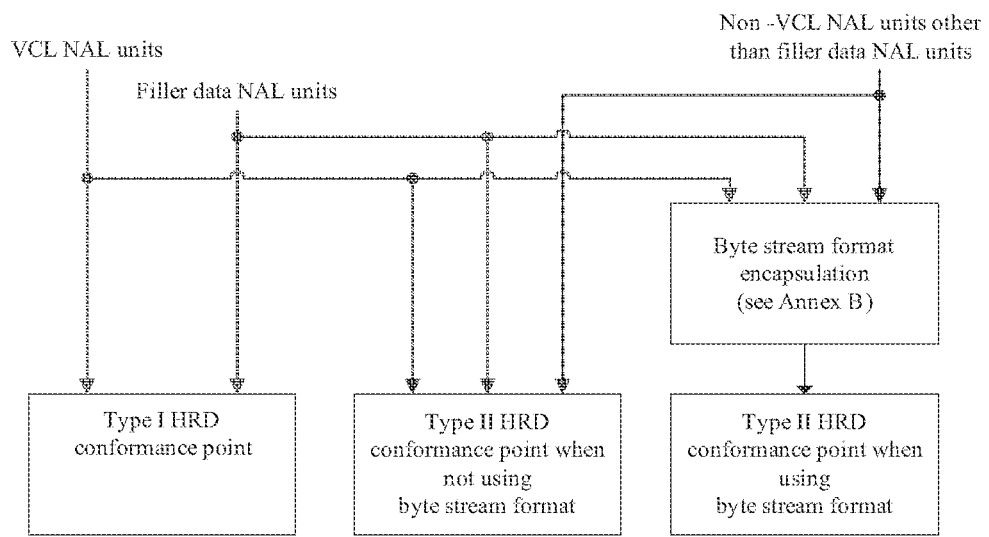
FIG. 9 shows a schematic diagram of HRD conformance checks of bitstreams according to some embodiments of the invention.

FIG. 9 shows the types of bitstream conformance points checked by the HRD.

Two types of HRD parameter sets (NAL HRD parameters and VCL HRD parameters) are used. The HRD parameter sets are signalled through the hrd_parameters( ) syntax structure, which may be part of the SPS syntax structure or the VPS syntax structure.

Multiple tests may be needed for checking the conformance of a bitstream, which is referred to as the bitstream under test. For each test, the following steps apply in the order listed:

1. An operation point under test, denoted as TargetOp, is selected. The layer identifier list OpLayerIdList of TargetOp consists of the list of nuh_layer_id values, in increasing order of nuh_layer_id values, present in the bitstream subset associated with TargetOp, which is a subset of the nuh_layer_id values present in the bitstream under test. The OpTid of TargetOp is equal to the highest TemporalId present in the bitstream subset associated with TargetOp.

2. TargetDecLayerIdList is set equal to OpLayerIdList of TargetOp, HighestTid is set equal to OpTid of TargetOp, and the sub-bitstream extraction process is invoked with the bitstream under test, HighestTid, and TargetDecLayerIdList as inputs, and the output is assigned to BitstreamToDecode.

3. When num_bitstream_partitions_minus1 is greater than 0, bitstream-specific CPB operation or bitstream-partition-specific CPB operation is selected. Both CPB operations shall be tested for checking the conformance of a bitstream. When bitstream-specific CPB operation is tested, the subsequent steps apply for the bitstream under test. When bitstream-partition-specific CPB operation is tested, the subsequent steps apply to each bitstream partition of the bitstream under test, referred to as the bitstream partition under test. When bitstream-partition-specific CPB operation is tested and the input to the HRD is a bitstream, the bitstream partitions are derived.

4. The hrd_parameters( ) syntax structure and the sub_layer_hrd_parameters( ) syntax structure applicable to TargetOp are selected as follows:
 If bitstream-specific CPB operation is tested, the following applies:
  If TargetDecLayerIdList contains all nuh_layer_id values present in the bitstream under test, the hrd_parameters( ) syntax structure in the active SPS (or provided through an external means) is selected.
  Otherwise, the hrd_parameters( ) syntax structure in the active VPS (or provided through some external means) that applies to TargetOp is selected.
 Otherwise, the hrd_parameters( ) syntax structure in the vps_vui_bsp_hrd( ) syntax structure in the active VPS (or provided through some external means) that applies to TargetOp and the bitstream partition under test is selected.
Within the selected hrd_parameters( ) syntax structure, if BitstreamToDecode is a Type I bitstream, the sub_layer_hrd_parameters(HighestTid) syntax structure that immediately follows the condition "if(vcl_hrd_parameters_present_flag)" is selected and the variable NalHrdModeFlag is set equal to 0; otherwise (BitstreamToDecode is a Type II bitstream), the sub_layer_hrd_parameters(HighestTid) syntax structure that immediately follows either the condition "if(vcl_hrd_parameters_present_flag)" (in this case the variable NalHrdModeFlag is set equal to 0) or the condition "if(nal_hrd_parameters_present_flag)" (in this case the variable NalHrdModeFlag is set equal to 1) is selected. When BitstreamToDecode is a Type II bitstream and NalHrdModeFlag is equal to 0, all non-VCL NAL units except filler data NAL units, and all leading_zero_8 bits, zero_byte, start_code_prefix_one_3 bytes, and trailing_zero_8 bits syntax elements that form a byte stream from the NAL unit stream (as specified in Annex B), when present, are discarded from BitstreamToDecode, and the remaining bitstream is assigned to BitstreamToDecode.

5. An access unit associated with a buffering period SEI message (present in BitstreamToDecode or available through external means) applicable to TargetOp is selected as the HRD initialization point and referred to as access unit 0. An applicable buffering period SEI message is selected from access unit 0 as follows:
 If bitstream-specific CPB operation is tested, the following applies:
  If TargetDecLayerIdList contains all nuh_layer_id values present in the bitstream under test, a non-nested buffering period SEI message is selected.
  Otherwise, a buffering period SEI message included in the scalable nesting SEI message with bitstream_subset_flag equal to 1 and applicable to TargetOp is selected.
 Otherwise, a buffering period SEI message included in the scalable nesting SEI message with bitstream_subset_flag equal to 0 and applicable to the bitstream partition under test is selected.

6. For each access unit in BitstreamToDecode starting from access unit 0, the a buffering period SEI message (present in BitstreamToDecode or available through external means) that is associated with the access unit and applies to TargetOp is selected, the a picture timing SEI message (present in BitstreamToDecode or available through external means) that is associated with the access unit and applies to TargetOp is selected, and when SubPicHrdFlag is equal to 1 and sub_pic_cpb_params_in_pic_timing_sei_flag is equal to 0, the a decoding unit information SEI messages (present in BitstreamToDecode or available through external means) that are associated with decoding units in the access unit and apply to TargetOp are selected as follows.
 If bitstream-specific CPB operation is tested, the following applies:
  If TargetDecLayerIdList contains all nuh_layer_id values present in the bitstream under test, non-nested buffering period, picture timing and decoding unit information SEI messages are selected.
  Otherwise, buffering period, picture timing and decoding unit information SEI messages included in the scalable nesting SEI message with bitstream_subset_flag equal to 1 and applicable to TargetOp are selected.
 Otherwise, buffering period, picture timing and decoding unit information SEI messages included in the scalable nesting SEI message with bitstream_subset_flag equal to 0 and applicable to the bitstream partition under test are selected.

7. A value of SchedSelIdx is selected as follows.
 If bitstream-specific CPB operation is tested, Tthe selected SchedSelIdx shall be in the range of 0 to cpb_cnt_minus1[HighestTid], inclusive, where cpb_cnt_minus1[HighestTid] is found in the sub_layer_hrd_parameters(HighestTid) syntax structure as selected above.
 Otherwise, a SchedSelCombIdx is selected for the bitstream under test and used for each bitstream partition under test. The selected SchedSelCombIdx shall be in the range of 0 to num_bsp_sched_combinations_minus1, inclusive. The selected SchedSelIdx shall be equal to bsp_comb_sched_idx[SchedSelCombIdx][j] where j is the index of the bitstream partition under test.

8. When the coded picture in access unit 0 has nal_unit_type equal to CRA_NUT or BLA_W_LP, and irap_cpb_params_present_flag in the selected buffering period SEI message is equal to 1, either of the following applies for selection of the initial CPB removal delay and delay offset:
 If NalHrdModeFlag is equal to 1, the default initial CPB removal delay and delay offset represented by nal_initial_cpb_removal_delay[SchedSelIdx] and nal_initial_cpb_removal_offset[SchedSelIdx], respectively, in the selected buffering period SEI message are selected. Otherwise, the default initial CPB removal delay and delay offset represented by vcl_initial_cpb_removal_delay[SchedSelIdx] and vcl_initial_cpb_removal_offset[SchedSelIdx], respectively, in the selected buffering period SEI message are selected. The variable DefaultInitCpbParamsFlag is set equal to 1.

If NalHrdModeFlag is equal to 1, the alternative initial CPB removal delay and delay offset represented by nal_initial_alt_cpb_removal_delay[SchedSelIdx] and nal_initial_alt_cpb_removal_offset[SchedSelIdx], respectively, in the selected buffering period SEI message are selected. Otherwise, the alternative initial CPB removal delay and delay offset represented by vcl_initial_alt_cpb_removal_delay[SchedSelIdx] and vcl_initial_alt_cpb_removal_offset[SchedSelIdx], respectively, in the selected buffering period SEI message are selected. The variable DefaultInitCpbParamsFlag is set equal to 0, and the RASL access units associated with access unit 0 are discarded from BitstreamToDecode and the remaining bitstream is assigned to BitstreamToDecode.

9. For bitstream-partition-specific CPB operation, SubPicHrdFlag is set equal to 1. For bitstream-specific CPB operation, when sub_pic_hrd_params_present_flag in the selected hrd_parameters( ) syntax structure is equal to 1, the CPB is scheduled to operate either at the access unit level (in which case the variable SubPicHrdFlag is set equal to 0) or at the sub-picture level (in which case the variable SubPicHrdFlag is set equal to 1).

When BitstreamToDecode is a Type II bitstream, the following applies:
  If the sub_layer_hrd_parameters(HighestTid) syntax structure that immediately follows the condition "if (vcl_hrd_parameters_present_flag)" is selected, the test is conducted at the Type I conformance point shown in FIG. 9, and only VCL and filler data NAL units are counted for the input bit rate and CPB storage.
  Otherwise (the sub_layer_hrd_parameters(HighestTid) syntax structure that immediately follows the condition "if(nal_hrd_parameters_present_flag)" is selected), the test is conducted at the Type II conformance point shown in FIG. 9, and all bytes of the Type II bitstream, which may be a NAL unit stream or a byte stream, are counted for the input bit rate and CPB storage.

For bitstream-specific CPB operation, the HRD contains a coded picture buffer (CPB), an instantaneous decoding process, a decoded picture buffer (DPB), and output cropping as shown in FIG. 10.

For bitstream-partition-specific CPB operation, the HRD comprises a bitstream demultiplexer (optionally present), two or more bitstream partition buffers (BPB), two or more instantaneous decoding processes, a decoded picture buffer (DPB), and output cropping, as shown in FIG. 8.

For each bitstream conformance test, the CPB size (number of bits) for bitstream-specific CPB operation and the BPB size for bitstream-partition-specific CPB operation is CpbSize[SchedSelIdx], where SchedSelIdx and the HRD parameters are specified above. The DPB size (number of picture storage buffers) is sps_max_dec_pic_buffering_minus 1 [HighestTid]+1.

The variable SubPicHrdPreferredFlag is either specified by external means, or when not specified by external means, set equal to 0.

When the value of the variable SubPicHrdFlag has not been set by step 9 above, it is derived as follows:
SubPicHrdFlag=SubPicHrdPreferredFlag && sub_pic_hrd_params_present_flag If SubPicHrdFlag is equal to 0, the HRD operates at access unit level and each decoding unit is an access unit. Otherwise the HRD operates at sub-picture level and each decoding unit is a subset of an access unit.

Herein, if the HRD operates at access unit level, each time a decoding unit that is an entire access unit is removed from the CPB. Otherwise (the HRD operates at sub-picture level), each time a decoding unit that is a subset of an access unit is removed from the CPB. In both cases, each time an entire decoded picture is output from the DPB, though the picture output time is derived based on the differently derived CPB removal times and the differently signalled DPB output delays.

The following constraints may be applied herein:
Each access unit is referred to as access unit n, where the number n identifies the particular access unit. Access unit 0 is selected per step 4 above. The value of n is incremented by 1 for each subsequent access unit in decoding order.
Each decoding unit is referred to as decoding unit m, where the number m identifies the particular decoding unit. The first decoding unit in decoding order in access unit 0 is referred to as decoding unit 0. The value of m is incremented by 1 for each subsequent decoding unit in decoding order. It should be noted that the numbering of decoding units is relative to the first decoding unit in access unit 0.
Picture n refers to the coded picture or the decoded picture of access unit n.
The HRD operates as follows:
The HRD is initialized at decoding unit 0, with the both the CPB and the DPB and each BPB being set to be empty (the DPB fullness is set equal to 0). After initialization, the HRD is not initialized again by subsequent buffering period SEI messages.
For bitstream-specific CPB operation, data associated with decoding units that flow into the CPB according to a specified arrival schedule are delivered by the HSS. For bitstream-partition-specific CPB operation, data associated with decoding units that flow into the BPB according to a specified arrival schedule are delivered by an HBPS.
When bitstream-partition-specific CPB operation is used, each bitstream partition with index j is processed with SchedSelIdx equal to bsp_comb_sched_idx[SchedSelCombIdx][j] and the HSS replaced by the HPBS.
The data associated with each decoding unit are removed and decoded instantaneously by the instantaneous decoding process at the CPB removal time of the decoding unit.
Each decoded picture is placed in the DPB.
A decoded picture is removed from the DPB when it becomes no longer needed for inter prediction reference and no longer needed for output.

Timing of Decoding Unit Arrival

If SubPicHrdFlag is equal to 0, the variable subPicParamsFlag is set equal to 0, and the process as specified below is invoked with a decoding unit being considered as an access unit, for derivation of the initial and final CPB arrival times for access unit n.

Otherwise (SubPicHrdFlag is equal to 1), the process as specified below is first invoked with the variable subPicParamsFlag set equal to 0 and a decoding unit being considered as an access unit, for derivation of the initial and final CPB arrival times for access unit n, and then invoked with subPicParamsFlag set equal to 1 and a decoding unit being considered as a subset of an access unit, for derivation of the initial and final CPB arrival times for the decoding units in access unit n.

The variables InitCpbRemovalDelay[SchedSelIdx] and InitCpbRemovalDelayOffset[SchedSelIdx] are derived as follows:

If one or more of the following conditions are true, InitCpbRemovalDelay[SchedSelIdx] and InitCpbRemovalDelayOffset[SchedSelIdx] are set equal to the values of the buffering period SEI message syntax elements nal_initial_alt_cpb_removal_delay[SchedSelIdx] and nal_initial_alt_cpb_removal_offset[SchedSelIdx], respectively, when NalHrdModeFlag is equal to 1, or vcl_initial_alt_cpb_removal_delay[SchedSelIdx] and vcl_initial_alt_cpb_removal_offset[SchedSelIdx], respectively, when NalHrdModeFlag is equal to 0, where the buffering period SEI message syntax elements are selected as:

Access unit 0 is a BLA access unit for which each coded picture has nal_unit_type equal to BLA_W_RADL or BLA_N_LP, and the value of irap_cpb_params_present_flag of the buffering period SEI message is equal to 1.

Access unit 0 is a BLA access unit for which each coded picture has nal_unit_type equal to BLA_W_LP or is a CRA access unit, and the value of irap_cpb_params_present_flag of the buffering period SEI message is equal to 1, and one or more of the following conditions are true:

UseAltCpbParamsFlag for access unit 0 is equal to 1.
DefaultInitCpbParamsFlag is equal to 0.

The value of subPicParamsFlag is equal to 1.

Otherwise, InitCpbRemovalDelay[SchedSelIdx] and InitCpbRemovalDelayOffset[SchedSelIdx] are set equal to the values of the buffering period SEI message syntax elements nal_initial_cpb_removal_delay[SchedSelIdx] and nal_initial_cpb_removal_offset[SchedSelIdx], respectively, when NalHrdModeFlag is equal to 1, or vcl_initial_cpb_removal_delay[SchedSelIdx] and vcl_initial_cpb_removal_offset[SchedSelIdx], respectively, when NalHrdModeFlag is equal to 0, where the buffering period SEI message syntax elements are selected as specified above.

Variables BspSyncFlag[bspIdx][m], BspSyncBspIdx[bspIdx][m] and BspSyncDuIdx[bspIdx][m] are derived for bitstream-partition-specific CPB operation for bitstream partitions with index bspIdx greater than 0 as follows:

If du_based_bpb_sync_flag[SchedSelCombIdx] is equal to 1, the following applies:

If the DU preceding, in decoding order within the bitstream, the m-th DU of bitstream partion with index bspIdx belongs to to a bitstream partition with an index prevBspIdx less than bspIdx, BspSyncFlag[bspIdx][m] is set equal to 1, BspSyncBspIdx[bspIdx][m] is set equal to prevBspIdx, and BspSyncDuIdx[bspIdx][m] is set equal to the decoding unit index of the preceding DU within the bitstream partition with index prevBspIdx.

Otherwise, BspSyncFlag[bspIdx][m] is set equal to 0.

Otherwise (du_based_bpb_sync_flag[SchedSelCombIdx] is equal to 0), the following applies:

If the DU is the first DU, in decoding order, of a picture and any picture in the inter-layer reference picture set has a nuh_layer_id value that belongs to a bitstream partition with a smaller index than bspIdx, BspSyncFlag[bspIdx][m] is set equal to 1, BspSyncBspIdx[bspIdx][m] is the greatest bitstream partition index refBspIdx smaller than bspIdx associated with the nuh_layer_id value refLayerId of any picture in the inter-layer reference picture set, and BspSyncDuIdx[bspIdx][m] is set equal to the decoding unit index (within the bitstream partition with index refBspIdx) of the last decoding unit of the picture with nuh_layer_id equal to refLayerId in the same access unit as the m-th DU of bitstream partition with index bspIdx.

Otherwise, BspSyncFlag[bspIdx][m] is set equal to 0.

The time at which the first bit of decoding unit m begins to enter the CPB is referred to as the initial arrival time initArrivalTime[m].

If bitstream-specific CPB operation is used, decoding units are indexed in decoding order within the bitstream. Otherwise (bitstream-partition-specific CPB operation is used), decoding units are indexed in decoding order with each bitstream partition, and thus a decoding unit may be identified with the pair of the bitstream partition index bspIdx and the decoding unit index m within the bitstream partition.

The initial arrival time of decoding unit m is derived as follows:

If the decoding unit is decoding unit 0 (i.e., m=0) and either bitstream-specific CPB operation is used or the decoding unit belongs to the base bitstream partition, initArrivalTime[0]=0, Otherwise, if the decoding unit is decoding unit 0, bitstream-partition-specific CPB operation is used, the decoding unit does not belong to the base bitstream partition and cbr_flag[SchedSelIdx] is equal to 1, the following applies:

initArrivalTime[0] is obtained from the bitstream partition initial arrival time SEI message.

Otherwise, the following applies:

The variable bspSyncFlag is derived as follows:

If bitstream-specific CPB operation is used or the decoding unit belongs to the base bitstream partition or BspSyncFlag[bspIdx][m] is equal to 0, bspSyncFlag is set equal to 0.

Otherwise, bspSyncFlag is set equal to 1.

---

If cbr_flag[ SchedSelIdx ] is equal to 1, the initial arrival time for decoding unit m is equal to the final arrival time (which is derived below) of decoding unit m − 1, i.e.,
  if( !subPicParamsFlag )
    initArrivalTime[ m ] = AuFinalArrivalTime[ m − 1 ] else
  initArrivalTime[ m ] = DuFinalArrivalTime[ m − 1 ]

---

When bspSyncFlag is equal to 1, it is a requirement of bitstream conformance that initArrivalTime[m] is greater than or equal to the final arrival time of the decoding unit with index BspSyncDuIdx[bspIdx][m] in the bitstream partition with index BspSyncBspIdx[bspIdx][m].

Otherwise (cbr_flag[SchedSelIdx] is equal to 0), the initial arrival time for decoding unit m is derived as follows:

--- if( !subPicParamsFlag )
    initArrivalTime[ m ] = Max( AuFinalArrivalTime[ m − 1 ], initArrivalEarliestTime[ m ] )
  else
    initArrivalTime[ m ] = Max( DuFinalArrivalTime[ m − 1 ], initArrivalEarliestTime[ m ], refFinalArrivalTime )

--- where initArrivalEarliestTime[m] is derived as follows:

The variable tmpNominalRemovalTime is derived as follows:

```
if( !subPicParamsFlag )
    tmpNominalRemovalTime = AuNominalRemovalTim[ m ]   else
    tmpNominalRemovalTime = DuNominalRemovalTime[ m ]
``` where AuNominalRemovalTime[m] and DuNominalRemovalTime[m] are the nominal CPB removal time of access unit m and decoding unit m, respectively.

If decoding unit m is not the first decoding unit of a subsequent buffering period, initArrivalEarliestTime [m] is derived as follows:

initArrivalEarliestTime[*m*]=*tmp*NominalRemovalTime−(Init*Cpb*RemovalDelay[*SchedSelIdx*]+Init*Cpb*RemovalDelayOffset[*SchedSelIdx*])÷90000

Otherwise (decoding unit m is the first decoding unit of a subsequent buffering period), initArrivalEarliestTime [m] is derived as follows:

initArrivalEarliestTime[*m*]=*tmp*NominalRemovalTime−(Init*Cpb*RemovalDelay[*SchedSelIdx*]÷90000)

and where refFinalArrivalTime is the final arrival time of the decoding unit with index BspSyncDuIdx[bspIdx][m] in the bitstream partition with index BspSyncBspIdx[bspIdx][m].

The final arrival time for decoding unit m is derived as follows:

```
if( !subPicParamsFlag )
        AuFinalArrivalTime[ m ] = initArrivalTime[ m ] +
sizeInbits[ m ] ÷ BitRate[ SchedSelIdx ]
    else
        DuFinalArrivalTime[ m ] = initArrivalTime[ m ] +
sizeInbits[ m ] ÷ BitRate[ SchedSelIdx ]
``` where sizeInbits[m] is the size in bits of decoding unit m, counting the bits of the VCL NAL units and the filler data NAL units for the Type I conformance point or all bits of the Type II bitstream for the Type II conformance point, where the Type I and Type II conformance points are as shown in FIG. 9.

The values of SchedSelIdx, BitRate[SchedSelIdx], and CpbSize[SchedSelIdx] are constrained as follows:

If the content of the selected hrd_parameters( ) syntax structures for the access unit containing decoding unit m and the previous access unit differ, the HSS selects a value SchedSelIdx1 of SchedSelIdx from among the values of SchedSelIdx provided in the selected hrd_parameters( ) syntax structures for the access unit containing decoding unit m that results in a BitRate[SchedSelIdx1] or CpbSize[SchedSelIdx1] for the access unit containing decoding unit m. The value of BitRate[SchedSelIdx1] or CpbSize[SchedSelIdx1] may differ from the value of BitRate[SchedSelIdx0] or CpbSize[SchedSelIdx0] for the value SchedSelIdx0 of SchedSelIdx that was in use for the previous access unit.

Otherwise, the HSS continues to operate with the previous values of SchedSelIdx, BitRate[SchedSelIdx] and CpbSize[SchedSelIdx].

When the HSS selects values of BitRate[SchedSelIdx] or CpbSize[SchedSelIdx] that differ from those of the previous access unit, the following applies:

The variable BitRate[SchedSelIdx] comes into effect at the initial CPB arrival time of the current access unit.

The variable CpbSize[SchedSelIdx] comes into effect as follows:

If the new value of CpbSize[SchedSelIdx] is greater than the old CPB size, it comes into effect at the initial CPB arrival time of the current access unit.

Otherwise, the new value of CpbSize[SchedSelIdx] comes into effect at the CPB removal time of the current access unit.

Scalable Nesting SEI Message Semantics

The scalable nesting SEI message provides a mechanism to associate SEI messages with bitstream subsets corresponding to various operation points or with specific layers or sub-layers.

A scalable nesting SEI message contains one or more SEI messages.

bitstream_subset_flag equal to 0 specifies that the SEI messages contained in the scalable nesting SEI message apply to specific layers or sub-layers. bitstream_subset_flag equal to 1 specifies that the SEI messages contained in the scalable nesting SEI message apply to one or more sub-bitstreams resulting from a sub-bitstream extraction process with inputs based on the syntax elements of the scalable nesting SEI message.

When a buffering period SEI message, a picture timing SEI message, or a decoding unit information SEI message is contained in the scalable nesting SEI message with bitstream_subset_flag equal to 0, they apply to the bitstream partition consisting of layers included in the list nestingLayerIdList[i].

Demultiplexing Process for Deriving a Bitstream Partition

Inputs to this process are a bitstream, a layer identifier list bspLayerId[idx] and the number of layer identifiers numBspLayerId in the layer index list bspLayerId[idx].

Output of this process is a bitstream partition.

Let variable minBspLayerId be the smallest value of bspLayerId[idx] with any value of idx in the range of 0 to numBspLayerId−1, inclusive.

The output bitstream partition consists of selected NAL units of the input bitstream in the same order as they appear in the input bitstream. The following NAL units of the input bitstream are omitted from the output bitstream partition, while the remaining NAL units of the input bitstream are included in the output bitstream partition:

Omit all NAL units that have a nuh_layer_id value other than bspLayerId[idx] with any value of idx in the range of 0 to numBspLayerId−1, inclusive.

Omit all SEI NAL units containing a scalable nesting SEI message for which no derived nestingLayerIdList[i] contains any layer identifier value equal to bspLayerId [idx] with any value of idx in the range of 0 to numBspLayerId−1, inclusive.

Omit all SEI NAL units containing a scalable nesting SEI message for which a derived nestingLayerIdList[i] contains a layer identifier value less than minBspLayerId.

Hybrid Codec Scalability

In many video communication or transmission systems, transport mechanisms and multimedia container file formats there are mechanisms to transmit or store the base layer separately from the enhancement layer(s). It may be considered that layers are stored in or transmitted through separate logical channels. Examples are provided in the following:

1. ISO Base Media File Format (ISOBMFF, ISO/IEC International Standard 14496-12): Base layer can be stored as a track and each enhancement layer can be stored in another track. Similarly, in a hybrid codec scalability case, a non-HEVC-coded base layer can be stored as a track (e.g. of sample entry type 'avc1'), while the enhancement layer(s) can be stored as another track which is linked to the base-layer track using so-called track references.
2. Real-time Transport Protocol (RTP): either RTP session multiplexing or synchronization source (SSRC) multiplexing can be used to logically separate different layers.
3. MPEG-2 transport stream (TS): Each layer can have a different packet identifier (PID) value.

Many video communication or transmission systems, transport mechanisms and multimedia container file formats provides means to associate coded data of separate logical channels, such as of different tracks or sessions, with each other. For example, there are mechanisms to associate coded data of the same access unit together. For example, decoding or output times may be provided in the container file format or transport mechanism, and coded data with the same decoding or output time may be considered to form an access unit.

It may be desirable to specify a format, which can encapsulate NAL units and/or other coded data units of two or more standards or coding systems into the same a bitstream, byte stream, NAL unit stream or alike. In the following, embodiments to include AVC NAL units and HEVC NAL units in a same NAL unit stream are described. The described embodiments may be applied independently of or together with other embodiments. It needs to be understood that embodiments could be realized similarly for coded data units other than NAL units, for bitstream or byte stream format, for any coding standards or systems. In the following, the base layer is considered to be AVC-coded and the enhancement layer is considered to be coded with an HEVC extension, such as SHVC or MV-HEVC. It needs to be understood that embodiments could be realized similarly if more than layer is of a first coding standard or system, such as AVC or its extensions like MVC, and/or more than one layer is a second coding standard. Likewise, it needs to be understood that embodiments could be realized similarly when layers represent more than two coding standards. For example, the base layer may be coded with AVC, an enhancement layer may be coded with MVC and represent a non-base view, and either or both of the previous layers may be enhanced by a spatial or quality scalable layer coded with SHVC.

The options for a NAL unit stream format encapsulating both AVC and HEVC NAL units include but are not limited to the following:
1. AVC NAL units may be contained in an HEVC-compliant NAL unit stream. One or more NAL unit types, which may be referred to as AVC container NAL units, may be specified among the nal_unit_type values specified in the HEVC standard to indicate an AVC NAL unit. An AVC NAL unit, which may include the AVC NAL unit header, may then be included as a NAL unit payload in an AVC container NAL unit.
2. HEVC NAL units may be contained in an AVC-compliant NAL unit stream. One or more NAL unit types, which may be referred to as HEVC container NAL units, may be specified among the nal_unit_type values of the AVC standard to indicate an HEVC NAL unit. An HEVC NAL unit, which may include the HEVC NAL unit header, may then be included as a NAL unit payload in an HEVC container NAL unit.

In some embodiments, rather than containing data units of a first coding standard or system, a bitstream, byte stream, NAL unit stream or alike of a second coding standard or system refers to data units of the first coding standard.

Additionally, properties of the data units of the first coding standard may be provided within the bitstream, byte stream, NAL unit stream or alike of the second coding standard, The properties may relate to operation of the decoded reference picture marking, processing and buffering, which may be a part of decoding, encoding, and/or HRD operation. Alternatively or additionally, the properties may relate buffering delays, such as CPB and DPB buffering delays, and/or HRD timing, such as CPB removal times or alike. Alternatively or additionally, the properties may relate to picture identification or association to access units, such as picture order count. The properties may enable to handle a decoded picture of the first coding standard or system in the decoding process and/or HRD of the second coding standard as if the decoded picture were decoded according to the second coding standard. For example, the properties may enable to handle a decoded AVC base-layer picture in the decoding process and/or HRD of SHVC or MV-HEVC as if the decoded picture was an HEVC base-layer picture.

In some embodiments, buffering period, picture timing, and/or decoding unit information and/or similar HRD related information may be provided according to a second coding standard or system for a base layer of a first coding standard or system. For example, HEVC buffering period SEI messages, HEVC picture timing SEI messages and/or HEVC decoding unit information SEI messages for the base layer may be present in an SHVC or MV-HEVC bitstream, where the base layer is AVC-coded and the base-layer NAL units are not present in the bitstream. Likewise, the base-layer HRD parameters provided in the SPS and/or VPS or their VUI parts may be present in the bitstream. This above-mentioned base-layer HRD related information (SEI messages, SPS and/or VPS) may be used to operate the CPB and DPB in the decoder and/or the HRD. The encoder or another entity may choose values for the base-layer HRD related information such that the decoded base-layer pictures are available for the enhancement layer decoding according to the decoding process and/or the HRD process.

In some embodiments, a decoded base-layer picture is provided as reference for inter-layer prediction for the enhancement layer decoding process immediately after its decoding. For example, the decoded pictures of AVC base layer pictures are provided as reference for inter-layer prediction to the HEVC-extension (SHVC or MV-HEVC) decoder immediately after their decoding. When the base layer is regarded as a single-layer bitstream, it may be subject to a first set of delays, particularly DPB delays. For example, an AVC base layer may be subject to the DPB delays specified according to the AVC standard and included in the AVC bitstream. However, in some embodiments, these delays are not taken into account when the decoded base-layer pictures are provided for a decoding process of enhancement layer(s). In other words, decoded base-layer pictures may be input to the enhancement layer decoding or HRD process without considering the DPB delays specified for the base layer (e.g. in the AVC bitstream).

In order for the DPB to operate correctly in the case of hybrid standards scalability (i.e. the base layer being non-HEVC-coded), the base layer pictures may be at least conceptually be included in the DPB operation of the scalable bitstream and be assigned one or more of the following properties or alike:
1. NoOutputOfPriorPicsFlag (for IRAP pictures)
2. PicOutputFlag
3. PicOrderCntVal
4. Reference picture set These properties are needed for the base layer because the DPB for the base layer does not operate independently of the other layers due to the following reasons:

1. The base layer has output characteristics that may be related to the other layers, e.g.:
   a. In some operation points, the base layer may be among the output layers, in some the base layer might not be among output layers.
   b. The output of a base layer picture in a certain access unit should be synchronized with the output of the pictures of other layers in the same access.
   c. The base layer pictures may be assigned or it may be desirable to assign the base layer information that is specific to the output operation, such as no_output_of_prior_pics_flag and pic_output_flag.
2. The marking of base layer pictures as "unused for reference" shall not precede using the base layer picture as an inter-layer reference picture. In H.264/AVC, a picture can be marked as "unused for reference" immediately after its decoding.
3. The marking of base layer pictures as "used for reference" and "unused for reference" affects the emptying of picture storage buffers and hence the total memory use of the DPB.

Therefore in some embodiments, non-HEVC-coded base layer pictures are associated with the above-mentioned properties. It is proposed that the association can be made through external means (outside the bitstream format) or through indicating the properties in specific NAL units in the HEVC bitstream. In some embodiments, the specific NAL units may additionally include base-layer coded data.

In some embodiments, the encoder or another entity may indicate in a sequence-level syntax structure, such as VPS, one or more of the following with one or more syntax elements:

whether or not the base layer (or an indicated or inferred number of layers, whose layer identifiers may be indicated or inferred) is coded according to a second format, such as HEVC or its extension, such as SHVC or MV-HEVC;
whether or not coded data, such as VCL NAL units, of the base layer are present in the bitstream;
whether or not HRD-related information of the second format, such as HEVC, is provided for the base layer (e.g. AVC-coded base layer) in the bitstream;
an identifier of a first format to which the base layer conforms.

The decoder or another entity may decode one or more of the above-mentioned information from the one or more syntax elements of the sequence-level syntax structure, such as VPS.

When the non-HEVC-coded base layer is included in the same bitstream as the HEVC-extension-coded enhancement layers, the following properties may be assigned for the base layer pictures:
1. The 2-byte NAL unit header of HEVC NAL units, including nuh_layer_id and nuh_temporal_id_plus1, which can be used for bitstream extraction and adaptation.
2. NAL unit types, which enable to indicate an IRAP picture of the base layer (versus a non-IRAP picture) and sub-layer non-reference pictures, which may make the bitstream adaptation performed in media-aware network elements (MANEs) more straightforward. Altogether, three VCL NAL unit type values may be assigned: NON_HEVC_IRAP (for non-HEVC-coded IRAP picture), NON_HEVC_R (for non-HEVC-coded sub-layer reference picture), and NON_HEVC_N (for non-HEVC-coded sub-layer non-reference picture).
3. first_slice_segment_in_pic_flag, which enables detection of the start of an access unit (when the NAL unit is not preceded by other NAL units that can start an access unit, such as the access unit delimiter NAL unit) or the start of a coded base layer picture.

In some embodiments, a decoder of a second format provides an interface through which a decoded base-layer picture is entered to the decoding process of the second format. A decoder of a first format decodes a base-layer picture. A player or a decoding logic or alike may assign a label or identifier, such as a decoding time, with the decoded base-layer picture and provide the decoded base layer-picture and the label through the interface. In some embodiments, the properties (as described above) may be stored in a container file or conveyed with a transport mechanism with the base-layer picture and a player or a decoding logic or alike may decode the properties and provide them along the decoded base layer picture through the interface.

A sub-bitstream extraction of coded data of a first format encapsulated within coded data units of a second format may operate as follows as described by means of a non-limiting example of AVC sub-bitstream extraction from an HEVC bitstream where AVC base-layer NAL units are contained in specific NAL units (with nal_unit_type values equal to NON_HEVC_IRAP, NON_HEVC_N, NON_HEVC_R, and NON_HEVC_NVCL in this example). The sub-bitstream extraction may be used for example in a bitstream demultiplexer that precedes decoding processes. Inputs to this process are A HEVC extension bitstream, such as an SHVC or MV-HEVC bitstream, containing an AVC-coded base layer included in specific NAL units;

a target highest TemporalId value tIdTarget.

Output of this process is a sub-bitstream that conforms to the AVC standard. The output sub-bitstream may be derived as follows:

Omit all NAL units that have nuh_layer_id greater than 0 from the output sub-bitstream.

Omit all NAL units with nal_unit_type not equal to NON_HEVC_IRAP, NON_HEVC_N, NON_HEVC_R, and NON_HEVC_NVCL from the output sub-bitstream.

Omit all NAL units with TemporalId greater than tIdTarget from the output sub-bitstream.

In the decoding order of the remaining NAL units, include the AVC NAL unit contained in the specific HEVC NAL units (NON_HEVC_IRAP, NON_HEVC_N, NON_HEVC_R, and NON_HEVC_NVCL) into the output sub-bitstream.

Regarding the issues to be addressed especially in the context of the ongoing MV-HEVC/SHVC standardization, it may be concluded that said issues are addressed at least as follows:

1. Adding or removing layers at re-distribution points with straightforward implications on HRD parameters and their signalling.

The added layers can form a bitstream partition of themselves and HRD parameters can be derived for the bitstream partition containing the added layers. HRD parameters need not be recounted for the previously existed layers, as they can be considered to form a bitstream partition by themselves. In an embodiment, which may be applied independently of or together with other embodiments, the support for layer addition at a re-distribution point is improved as follows. In the present draft SHVC and MV-HEVC standards (JCTVC-N1008 and JCT3V-E1004, respectively), VPS specifies, among other things, the inter-layer prediction dependencies of all layers in the bitstream. Hence, when a layer is added at a re-distribution point, the VPS has to be rewritten according to specify the new layer and its inter-layer prediction relations to the layers that existed in the bitstream already. As the VPS will therefore grow in size, the HRD parameters may need to be re-derived and signaled again in the bitstream. To avoid VPS and HRD parameter re-writing, a bitstream according to the embodiment may add a VPS into the bitstream with nuh_layer_id equal to the layer that was added. Both the added VPS NAL unit and the layer can reside in a new bitstream partition, and hence HRD parameters only for that bitstream partition need to be counted, while the HRD parameters for the bitstream partition(s) that already existed prior to the layer addition may remain intact. The added VPS associates with a VPS of the same identifier value (vps_video_parameter_set_id) with nuh_layer_id equal to 0. The VPS syntax when nuh_layer_id is greater than 0 may enable one or both of the following. First, a VPS with nuh_layer_id greater than 0 may include only those syntax structures and elements that are needed to specify the added layer and its relation to other layers. Second, a VPS with nuh_layer_id greater than 0 may be required to contain a copy of the content in the VPS with nuh_layer_id equal to 0 or resolve to the same variable values than when decoding the VPS with nuh_layer_id equal to 0. In both cases, the added VPS does not change the impact of existing VPSs for the existing layers. An encoder or another entity e.g. operating at a re-distribution point may add a VPS with nuh_layer_id greater than 0 into the bitstream, and/or the bitstream partition containing the added layer and/or convey the added VPS by other means, such as through a signaling protocol. A decoder, an HRD, or another entity, such as a media-aware network element, may decode a VPS with nuh_layer_id greater than 0 from the bitstream, and/or from the bitstream partition containing the added layer and/or from other means, such as using a signaling protocol. The decoder or HRD may use the decoded added VPS in the decoding process for the added layer, for example to conclude the candidate inter-layer reference pictures for a picture on the added layer.

The present MV-HEVC/SHVC design already supports indicating HRD parameters for a subset of layers. Hence, it is believed that no changes are needed to support removal of layers at re-distribution points.

2. Support for ultra-low delay with layered scalability.

In the proposed CPB operation, the DU processing periods (from the CPB initial arrival until the CPB removal) can be overlapping in different BPBs. Hence, the HRD model inherently supports parallel processing with an assumption that the decoding process for each bitstream partition is able to decode in real-time the incoming bitstream partition with its scheduled rate.

The prediction dependencies between DUs of different layers are taken into account as follows. When the cbr_flag is equal to 0, the initial arrival time of a DU into BPB 1 is limited not to start earlier than the final arrival time of any DU or picture it predicts from. When the cbr_flag is equal to 1, a non-zero initial arrival time for DU 0 is defined for BPB 1 (and higher) and it is a requirement for bitstream conformance (and particularly to the initial arrival delay) that the initial arrival time of a DU into BPB 1 shall not start earlier than the final arrival time of any DU or picture it predicts from.

3. Hybrid codec scalability, where the base layer is not HEVC-coded.

The base bitstream partition is considered to consist of the non-HEVC-coded base layer. If the non-HEVC-coded base layer resides in a different bitstream than the HEVC-coded enhancement layers, the CPB of the non-HEVC-coded base layer bitstream operates according to the specification where it is specified. The remaining of the bitstream is handled with bitstream-partition-specific CPB operation, which makes sure that the processing of a base layer picture has been completed in the CPB before starting the processing of any enhancement layer picture depending on it.

4. Inherent support for multi-core processing.

As described above for step 2. The proposed HRD model can either support indicating timing for low-delay multi-core processing when du_based_bpb_sync_flag is equal 1, or indicating timing for picture-based multi-core processing suiting hybrid codec scalability.

5. Inherent support for systems where layers are transmitted using separate logical channels without a need to re-multiplex layers into one bitstream.

The data conveyed in each logical channel can represent a separate bitstream partition.

Figure 11:
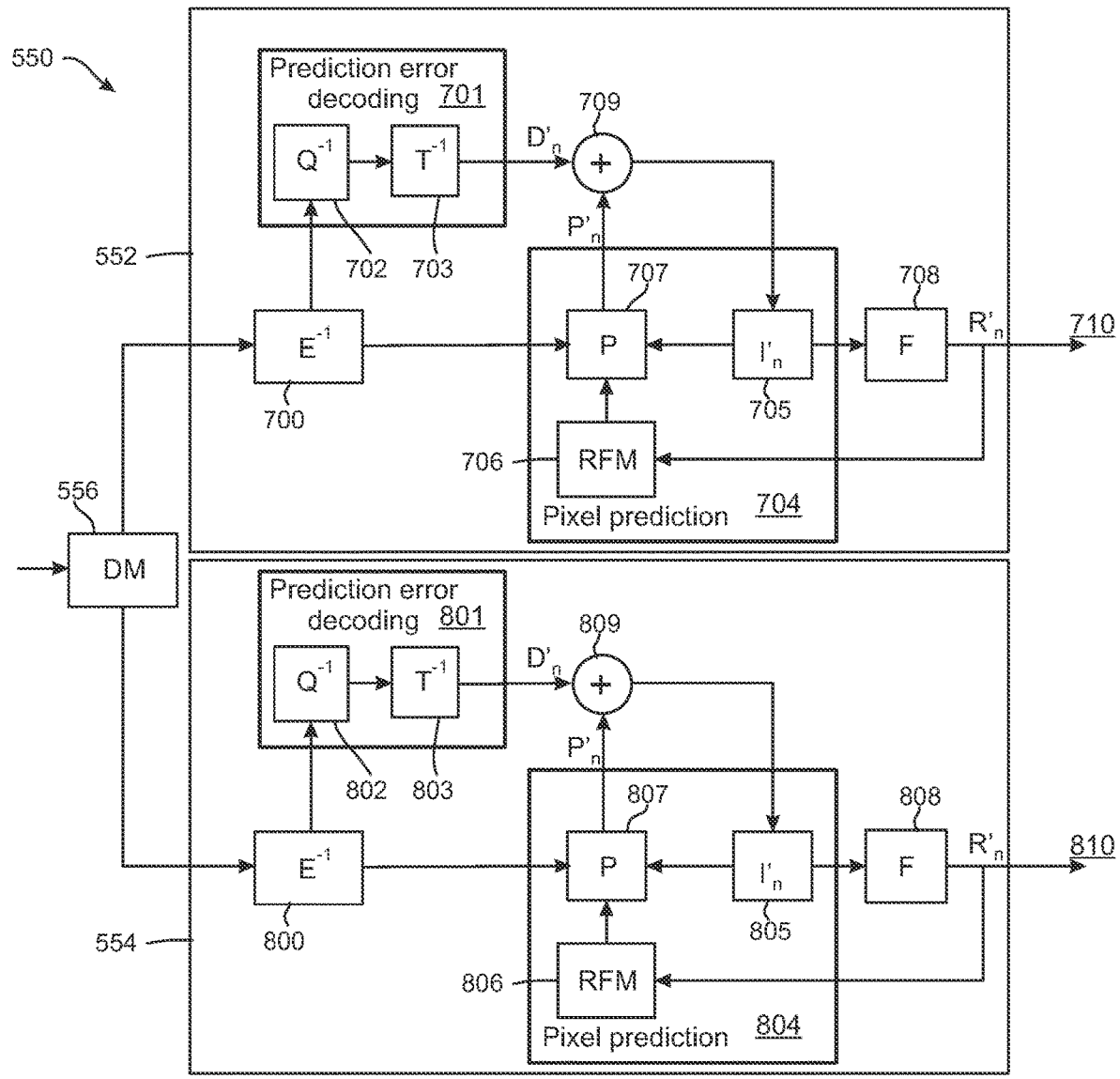
FIG. 11 shows a schematic diagram of a decoder suitable for implementing some embodiments of the invention.

FIG. 11 shows a block diagram of a video decoder suitable for employing embodiments of the invention. FIG. 11 depicts a structure of a two-layer decoder, but it would be appreciated that the decoding operations may similarly be employed in a single-layer decoder.

The video decoder 550 comprises a first decoder section 552 for base view components and a second decoder section 554 for non-base view components. Block 556 illustrates a demultiplexer for delivering information regarding base view components to the first decoder section 552 and for delivering information regarding non-base view components to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base view/non-base view components to obtain the preliminary reconstructed images (I'n). Preliminary reconstructed and filtered base view images may be output 709 from the first decoder section 552 and preliminary reconstructed and filtered base view images may be output 809 from the first decoder section 554.

In the above, some embodiments have been described in relation to encoding indications, syntax elements, and/or syntax structures into a bitstream or into a coded video sequence and/or decoding indications, syntax elements, and/or syntax structures from a bitstream or from a coded video sequence. It needs to be understood, however, that embodiments could be realized when encoding indications, syntax elements, and/or syntax structures into a syntax structure or a data unit that is external from a bitstream or a coded video sequence comprising video coding layer data, such as coded slices, and/or decoding indications, syntax elements, and/or syntax structures from a syntax structure or a data unit that is external from a bitstream or a coded video sequence comprising video coding layer data, such as coded slices.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising
decoding an indication relating to a number of bitstream partitions;
allocating processing units to the bitstream partitions in accordance with the indication of the number of bitstream partitions;
associating a first set of data units into a first bitstream partition and associating a second set of data units into a second bitstream partition, where the first set comprises data units different from those of the second set, wherein the number of bitstream partitions into which the data units are associated is defined by the indication;
inputting the first bitstream partition into a first buffer;
inputting the second bitstream partition into a second buffer;
obtaining buffering parameters including a flag that takes into account prediction dependencies between decoding units of different layers and further including an initial arrival delay for the second bitstream partition and the second buffer by decoding a supplemental enhancement information message comprising the initial arrival delay, wherein the initial arrival delay is differently defined depending upon a value of the flag;
using the buffering parameters in at least one of inputting the second bitstream partition into the second buffer and outputting from the second buffer including starting the inputting of the second bitstream partition into the second buffer when the initial arrival delay has elapsed such that processing periods of the data units in the first and the second bitstream partitions are overlapping; and
determining first and second types of bitstream conformance points to be checked based upon video coding layer (VCL) network abstraction layer (NAL) units and filler data NAL units.

2. The method according to claim 1, further comprising:
encoding a nesting data structure indicating a bitstream partition; and encoding the buffering parameters within the nesting data structure.

3. The method according to claim 2, wherein the nesting data structure is a bitstream partition nesting supplemental enhancement information (SEI) message.

4. The method according to claim 1, further comprising:
indicating in a sequence-level syntax structure, whether the bitstream contains buffering parameters for bitstream-partition-specific operations.

5. The method according to claim 4, wherein a Video Usability Information (VUI) part of a Video Parameter Set (VPS) comprises a syntax element indicating the number of bitstream partitions for which Hypothetical Reference Decoder (HRD) parameters are provided.

6. The method according to claim 1, further comprising:
indicating a plurality of ways for partitioning the same bitstream; and
providing Hypothetical Reference Decoder (HRD) parameters for more than one partitioning.

7. The method according to claim 6, further comprising:
including bitstream-partition-specific HRD parameters in a sequence-level syntax structure, such as VPS.

8. The method according to claim 1, further comprising:
including a number of schedules in a sequence-level syntax structure, the sequence-level syntax structure further indicating a coded picture buffer (CPB) size and bitrate used for each bitstream partition.

9. The method according to claim 1, further comprising:
inputting a bitstream comprising the first set of data units and the second set of data units, wherein a header of each data unit comprises a layer identifier;
inputting a first set of layer identifier values corresponding to the first set of data units;
selecting the first bitstream partition to comprise those data units with a layer identifier equal to any value of the first set of layer identifier values;
inputting a second set of layer identifier values corresponding to the second set of data units; and
selecting the second bitstream partition to comprise those data units with a layer identifier equal to any value of the second set of layer identifier values.

10. An apparatus comprising:
at least one processor and at least one memory, said at least one memory stored with code thereon, which when executed by said at least one processor, causes an apparatus to perform at least:
decoding an indication relating to a number of bitstream partitions;
allocating processing units to the bitstream partitions in accordance with the indication of the number of bitstream partitions;
associating a first set of data units into a first bitstream partition and associating a second set of data units into a second bitstream partition, where the first set comprises data units different from those of the second set, wherein the number of bitstream partitions into which the data units are associated is defined by the indication;
inputting the first bitstream partition into a first buffer;
inputting the second bitstream partition into a second buffer;
obtaining buffering parameters including a flag that takes into account prediction dependencies between decoding units of different layers and further including an initial arrival delay for the second bitstream partition and the second buffer by decoding a supplemental enhancement information message comprising the initial arrival delay, wherein the initial arrival delay is differently defined depending upon a value of the flag;
using the buffering parameters in at least one of inputting the second bitstream partition into the second buffer and outputting from the second buffer including starting the inputting of the second bitstream partition into the second buffer when the initial arrival delay has elapsed such that processing periods of the data units in the first and the second bitstream partition are overlapping; and
determining first and second types of bitstream conformance points to be checked based upon video coding layer (VCL) network abstraction layer (NAL) units and filler data NAL units.

11. The apparatus according to claim 10, further comprising code stored on said at least one memory causing the apparatus to perform at least:
encoding a nesting data structure indicating a bitstream partition; and
encoding the buffering parameters within the nesting data structure.

12. The apparatus according to claim 10, further comprising code stored on said at least one memory causing the apparatus to perform at least:
indicating in a sequence-level syntax structure, whether the bitstream contains buffering parameters for bitstream-partition-specific operations.

13. The apparatus according to claim 12, wherein a Video Usability Information (VUI) part of a Video Parameter Set (VPS) comprises a syntax element indicating the number of bitstream partitions for which Hypothetical Reference Decoder (HRD) parameters are provided.

14. A non-transitory computer readable storage medium stored with code thereon for use by an apparatus, which when executed by a processor, causes the apparatus to perform:
decoding an indication relating to a number of bitstream partitions;
allocating processing units to the bitstream partitions in accordance with the indication of the number of bitstream partitions;
associating a first set of data units into a first bitstream partition and associating a second set of data units into a second bitstream partition, where the first set comprises data units different from those of the second set;
inputting the first bitstream partition into a first buffer;
inputting the second bitstream partition into a second buffer, wherein the number of bitstream partitions into which the data units are associated is defined by the indication;
obtaining buffering parameters including a flag that takes into account prediction dependencies between decoding units of different layers and further including an initial arrival delay for the second bitstream partition and the second buffer by decoding a supplemental enhancement information message comprising the initial arrival delay, wherein the initial arrival delay is differently defined depending upon a value of the flag;
using the buffering parameters in at least one of inputting the second bitstream partition into the second buffer and outputting from the second buffer including starting the inputting of the second bitstream partition into the second buffer when the initial arrival delay has elapsed such that processing periods of the data units in the first and the second bitstream partition are overlapping; and determining first and second types of bitstream conformance points to be checked based upon video coding layer (VCL) network abstraction layer (NAL) units and filler data NAL units.

15. A video decoder configured for decoding a bitstream comprising an image sequence, wherein said video decoder is further configured for:
- decoding an indication relating to a number of bitstream partitions;
- allocating processing units to the bitstream partitions in accordance with the indication of the number of bitstream partitions;
- associating a first set of data units into a first bitstream partition and associating a second set of data units into a second bitstream partition, where the first set comprises data units different from those of the second set;
- inputting the first bitstream partition into a first buffer;
- inputting the second bitstream partition into a second buffer, wherein the number of bitstream partitions into which the data units are associated is defined by the indication;
- obtaining buffering parameters including a flag that takes into account prediction dependencies between decoding units of different layers and further including an initial arrival delay for the second bitstream partition and the second buffer by decoding a supplemental enhancement information message comprising the initial arrival delay, wherein the initial arrival delay is differently defined depending upon a value of the flag;
- using the buffering parameters in at least one of inputting the second bitstream partition into the second buffer and outputting from the second buffer including starting the inputting of the second bitstream partition into the second buffer when the initial arrival delay has elapsed such that processing periods of the data units in the first and the second bitstream partition are overlapping; and
- determining first and second types of bitstream conformance points to be checked based upon video coding layer (VCL) network abstraction layer (NAL) units and filler data NAL units.

16. A method for decoding a bitstream comprising an image sequence, the method comprising:
- decoding an indication relating to a number of bitstream partitions;
- allocating processing units to the bitstream partitions in accordance with the indication of the number of bitstream partitions;
- associating a first set of data units into a first bitstream partition and associating a second set of data units into a second bitstream partition, where the first set comprises data units different from those of the second set;
- inputting the first bitstream partition into a first buffer;
- inputting the second bitstream partition into a second buffer, wherein the number of bitstream partitions into which the data units are associated is defined by the indication;
- obtaining buffering parameters including a flag that takes into account prediction dependencies between decoding units of different layers and further including an initial arrival delay for the second bitstream partition and the second buffer by decoding a supplemental enhancement information message comprising the initial arrival delay, wherein the initial arrival delay is differently defined depending upon a value of the flag;
- using the buffering parameters in at least one of inputting the second bitstream partition into the second buffer and outputting from the second buffer including starting the inputting of the second bitstream partition into the second buffer when the initial arrival delay has elapsed such that processing periods of the data units in the first and the second bitstream partition are overlapping; and
- determining first and second types of bitstream conformance points to be checked based upon video coding layer (VCL) network abstraction layer (NAL) units and filler data NAL units.

* * * * *